United States Patent [19]
Barger et al.

[11] Patent Number: 5,626,665
[45] Date of Patent: May 6, 1997

[54] CEMENTITIOUS SYSTEMS AND NOVEL METHODS OF MAKING THE SAME

[75] Inventors: Gregory S. Barger, Overland Park; Eric R. Hansen, Shawnee, both of Kans.

[73] Assignee: Ash Grove Cement Company, Overland Park, Kans.

[21] Appl. No.: 334,820

[22] Filed: Nov. 4, 1994

[51] Int. Cl.$^6$ .............................. C04B 11/00; C04B 11/30
[52] U.S. Cl. ..................... 106/706; 106/707; 106/708; 106/709; 106/710; 106/715; 106/716; 106/718; 106/722; 106/732; 106/735; 106/739; 106/772; 106/773; 106/774
[58] Field of Search ........................ 106/693, 694, 106/695, 700, 701, 703, 706, 707, 709, 715, 716, 718, 722, 732, 735, 739, 773, DIG. 1, 793, 705, 708, 710, 772, 774, 778, 794; 501/144, 145, 141, 143, 150

[56] References Cited

U.S. PATENT DOCUMENTS

| | | | |
|---|---|---|---|
| 2,880,101 | 3/1959 | Ulfstedt | 106/709 |
| 3,589,920 | 6/1971 | Ostberg et al. | 106/739 |
| 3,950,470 | 4/1976 | Davidovits | 264/113 |
| 4,349,386 | 9/1982 | Davidovits | 264/333 |
| 4,407,677 | 10/1983 | Wills, Jr. | 106/716 |
| 4,442,021 | 4/1984 | Bürge et al. | |
| 4,452,635 | 6/1984 | Noshi et al. | 106/628 |
| 4,472,199 | 9/1984 | Davidovits | 264/333 |
| 4,509,985 | 4/1985 | Davidovits et al. | |
| 4,640,715 | 2/1987 | Heitzmann et al. | 106/709 |
| 4,793,861 | 12/1988 | Sohm | |
| 4,842,649 | 6/1989 | Heitzmann et al. | 106/707 |
| 4,975,396 | 12/1990 | Thiery | 501/90 |
| 5,122,191 | 6/1992 | Morozumi et al. | 106/718 |
| 5,288,321 | 2/1994 | Davidovits | |

FOREIGN PATENT DOCUMENTS

| | | | |
|---|---|---|---|
| 0722051 | 10/1984 | U.S.S.R. | 106/739 |
| 1127872 | 12/1984 | U.S.S.R. | 106/773 |
| 0012353 | of 1907 | United Kingdom | 106/739 |
| 8902878 | 4/1989 | WIPO | |

OTHER PUBLICATIONS

Article—"High–Reactivity Metakaolin: A New Generation Mineral Admixture" by Michael Caldarone et al. pp. 37–40 (Nov. 1994).
ASTM Test Method "Standard Test Method for Length, Change of Hydraulic–Cement Mortars . . . " Designation: C1012–89. (No Month Available)(1994) pp. 442–446.
ASTM C227–90—Standard Test Method for Potential Alkali Reactivity of Cement–Aggregate Combinations, (Aug. 1990) pp. 130–134.
ASTM C109–92—Standard Test Method for Compressive Strength of Hydraulic Cement Mortars, (Jun. 1992), pp. 62–66.
ASTM C1157–94a—Standard Performance Specification for Blended Hydraulic Cement, (May 1994), pp. 463–467.
ASTM C150–94—Standard Specification for Portland Cement, (Apr. 1994), pp. 125–129.

(List continued on next page.)

*Primary Examiner*—Paul Marcantoni
*Attorney, Agent, or Firm*—Stinson, Mag & Fizzell

[57] ABSTRACT

Novel cementitious systems comprised of gypsum, calcined clay, and clinker consisting essentially of hydraulic calcium silicates are disclosed which have the following properties: (1) a water demand of less than about 33% nc; (2) one-day strengths of at least about 1000 psi; and (3) low alkali functionality. By increasing the amount of calcined clay, the resulting cementitious system will sequentially gain the following properties: (1) alkali non-reactiveness; (2) alkali resistance; and (3) low chloride permeability. Novel methods of preparing the novel cementitious systems of this invention are also disclosed. The novel methods not only reduce production costs by decreasing fuel and raw material consumption, but they also allow the cement producer to proactively address significant environmental concerns related to the manufacturing process.

13 Claims, 12 Drawing Sheets

OTHER PUBLICATIONS

Pp. 642–645 of *Silicates* from *Descriptive Mineralogy*, (Nov., 1994) (No Author Included).

Pp. 158–161 of *Sedimentation and Sedimentary Rocks*, (Nov. 1994) (No Author Included).

Article "Study of Fiber Matrix Interfaces in Metakaolin–OPC Blended Cement GRC Composites", Ambroise et al. (No Month Available) 1988, pp. 175–180.

Article "The Pozzolanic Reaction of Metakaolinite and its Effects on Portland Cement Hydration", Dunster et al., (No Month Available) 1993, pp. 1345–1350.

Article "Properties of Mass Concrete Containing an Active Pozzolan Made from Clay", Saad, et al., (No Month Available) 1982, pp. 59–65.

Article "Effect of Metakaolin on Alkali–Silica Reaction (ASR) in Concrete Manufactured with Reactive Aggregate", Walters et al., (No Month Available) 1991, pp. 941–952.

Article "The Effectiveness of Mineral Admixtures in Reducing Expansion Due to Alkali–Aggregate Reaction . . . ", Oberholster et al., (No Month Available) 1981, pp. 1–11.

Article "Natural Zeolite for Preventing Expansion Due to Alkali–Aggregate Reaction", Naigian et al., 1992, pp. 93–96 (No Month Available).

Article "Microstructure and Porosity of Metakaolin Blended Cements", Bredy et al., 1989, pp. 431–436 (No Month Available).

Article "The Use of Pozzolan from Calcined Clays in Preventing Excessive Expansion Due to the Alkali–Aggregate Reaction . . . ", Andriolo et al., (No Month Available) (1994) pp. 66–70.

Article "Chemical Agents for Reducing Solubility of Silica in Sodium Hydroxide", Natesaiyer et al., 1992, pp. 653–662 (No Month Available).

Article "Archeology and Technology—An interview with J. Davidovits who claims to have solved mystery of the Pyramids", Prior to Nov., 1994.

Article "Kaolite Group (Kandites)" from *Sheet Silicates*, prior to (Nov., 1994) pp. 204–206.

Proposed ASTM C–9–P214—"Accelerated Detection of Potentially Deleterious Expansion of Mortar Bars . . . ", Jul. 1990, pp. 739–742.

ASTM C618–92a—"Standard Specification for Fly Ash and Raw or Calcined Natural Pozzolan for Use As a Mineral Admixture . . . ", (Jul. 1992), p. 306.

Article "Dehydration" from *Clay Mineralogy*, (No Month Available) 1968, pp. 301–304.

Article "Hydration Reaction and Hardening of Calcined Clays and Related Minerals.", Murat, et al., (Dec. 1982) pp. 631–637.

Article "The Effect of Mineral Admixtures on the Alkali–Silica Expansion of Concrete Under Outdoor Exposure . . . ", Oberholster et al., (No Month Available) 1981, pp. 60–65.

Article "Some Long Time Studies of Blended Cements with Emphasis on Alkali–Aggregate Reaction", Bhatty et al., (Nov. 1994) pp. 85–92.

Article "Mechanism of Pozzolanic Reactions and Control of Alkali–Aggregate Expansion", Bhatty, (Nov. 1994) pp. 70–77.

Article "Proposed Report: Use of Natural Pozzolans in Concrete", by ACI Committee 232, ACI Materials Journal, Jul.–Aug., 1994, pp. 410–426.

Article "Properties of Metakaolin Blended Cements", Ambroise et al., Jan., 1994, pp. 161–168.

Article "Electrical Indication of Concrete's Ability to Resist Chloride", *Methods of Sampling and Testing*, pp. 876–881, (Nov. 1994).

Article "New Cement Provides Practical Solution to Restore Deteriorating Highways, Bridges and Airports", *Louisiana Contractor*, Mar. 1988, pp. 30–35.

Article "World's Highest Performance Four–Hour Concrete", ASTM C293, (Nov. 1994) pp. 1–4.

Spec–Data Sheet 3—"Cast–In–Place Concrete", Hi Performance Blended Cement Pyrament/Lone Star Industries, Inc., (Nov. 1986), pp. 1–2.

Spec–Data Sheet 3—"Cast–in–Place Concrete—Concrete Repair Material", Nov. 1986, 2 pages.

ASTM C187–86—Standard Test Method for Normal Consistency of Hydraulic Cement, Sep. 1991, pp. 150–151.

Article "Chemical Reactivity of Thermally Activated Clay Minerals. Estimation by Dissolution Hydrofluoric Acid", Murat et al., (No Month Available) 1988, pp. 221–228.

Article "Hydration Reaction and Hardening of Calcined Clays and Related Minerals", Murat, (No Month Available) 1983, pp. 511–518.

Article "Hydration Reaction and Hardening of Calcined Clays and Related Minerals", Murat, 1983, pp. 259–266 (No Month Available).

Article "High Reactivity Metakaoline; A New Generation Mineral Admixture", Calderone et al., Nov., 1994, pp. 37–40.

Article "High Reactivity Metakaoline", Balogh, Jul., 1995, pp. 604–610.

Article "Phase Relations in the System $CaO-Al_2O_3-SiO_2-H_2O$ Relevant to Metakaoline–Calcium . . . ", de Silva, et al., (No Month Available) 1993, pp. 627–639.

Article "Pozzolanic Properties of Flash–Calcined Kaolinite: A Comparative Study . . . ", Salvador, (No Month Available) 1995, pp. 102–112.

Article "Pozzolanic Activity of Metakaolin Under Microwave Treatment", Oriol et al., 1995, pp. 265–269 (No Month Available).

Article "Pozzolanic Behavior of Thermally Activated Kaolin", Ambroise et al., 1992, pp. 731–748 (No Month Available).

Article "Hydration Reaction and Hardening of Calcined Clays and Related Minerals", Ambroise et al., (No Month Available) 1985, pp. 83–88.

Article "Pozzolanic Activation of Metakaolin", DeSilva et al., 1992, pp. 167–178 (No Month Available).

Article, "Hydration of Cements Based on Metakaolin: Thermochemistry", deSilva et al., (No Month Available) 1990, pp. 167–177.

Article "Hydration Reaction and Hardening of Calcined Clays and Related Minerals", Ambroise et al., (No Month Available) 1985, pp. 261–268.

Article "Role of Metakaolin In Suppressing ASR In Concrete Containing Reactive Aggreagate . . . ", Jones et al., (No Month Available) 1992, pp. 485–495.

Article "Petrographic Study on the Potential Alkali–Reactivity of Ferro–Nickel Slags . . . ", Katayama, (No Month Available) 1992, p. 497.

Article "Hydration Characteristics of Metakaolin–Lime–Gypsum", Serry et al., (No Month Available) 1985, pp. 287–296.

Article "Some Factors Influencing Metakaolin–Lime Hydration", Jhaha et al., 1988, pp. 49–53 (No Month Available).

Article "Pozzolanic Activation of Metakaoline", DeSilva et al., 1992, pp. 167–178 (No Month Available).

Article "Hydration of Synthetic Pozzolanic Binders Obtained by Thermal Activation of Montmorillonite", Amboise et al., (No Month Available) 1987, pp. 1731–1733.

Article "Investigations of Synthetic Binders Obtained by Middle–Temperature Thermal Dissociation . . . ", Ambroise et al., (No Month Available) 1992, pp. 99–107.

Article "The Use of Pozzolan from Calcined Clays in Preventing Excessive Expansion Due to the Alkali–Aggregate . . . ", Andriolo et al., (No Month Available) 1986, pp. 66–70.

Article "Chemicaly–Bonded Cementitious Materials Based on Metakaolin", Palomo et al., (No Month Available) 1992, pp. 107–112.

Article "Modelling of Combined Heating and Dehydroxylation of Kaolinite Particles During Flash . . . ", Salvador et al., (No Month Available) 1994, pp. 128–135.

Article "Influence of Calcination Conditions on the Hydration of Metakaolin–Lime", Serry et al., (No Month Available) 1987, pp. 83–87.

Article "Metakaolin–Lime Hydration Products", Serry et al., (No Month Available) 1984, pp. 103–110.

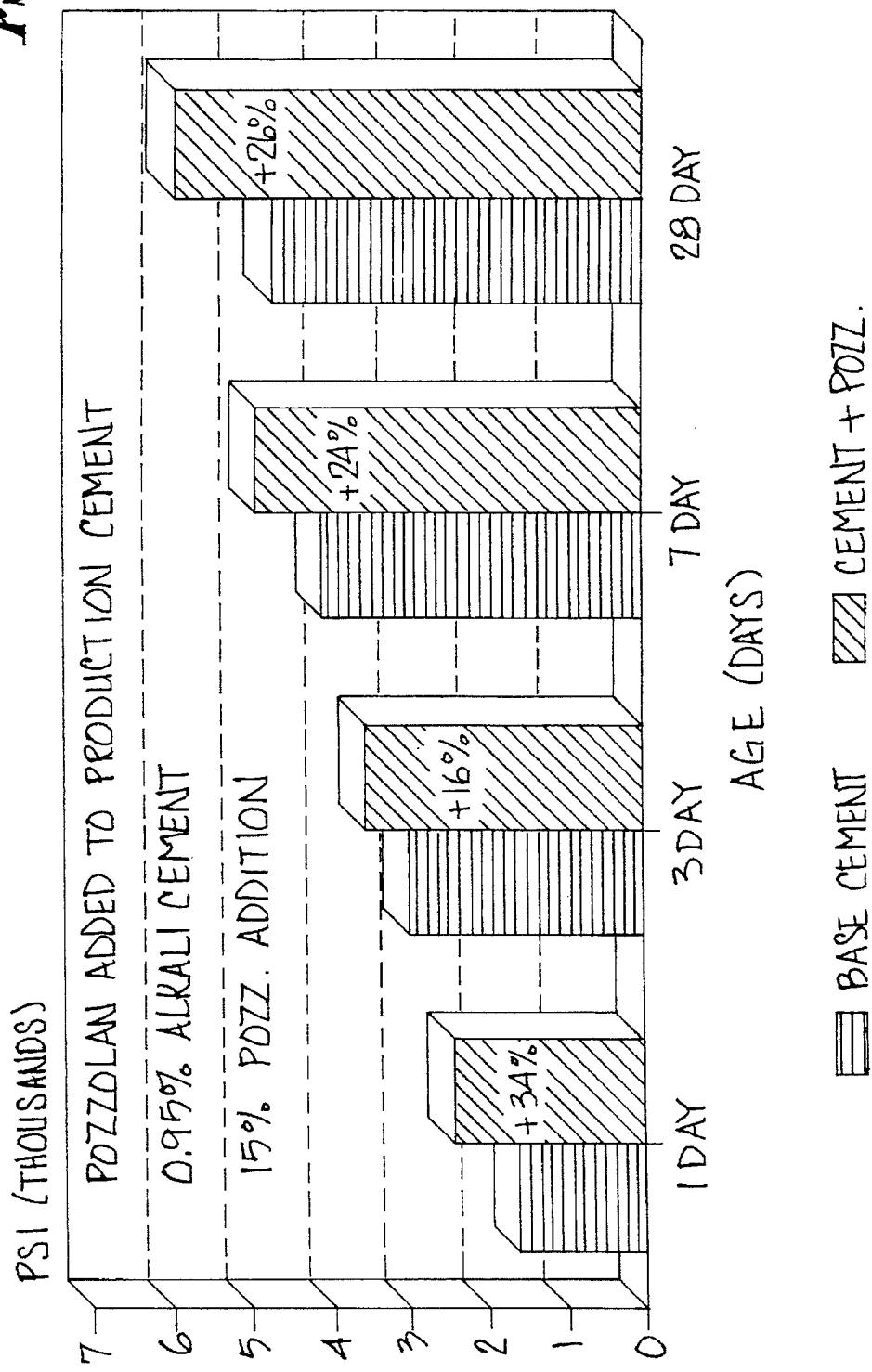

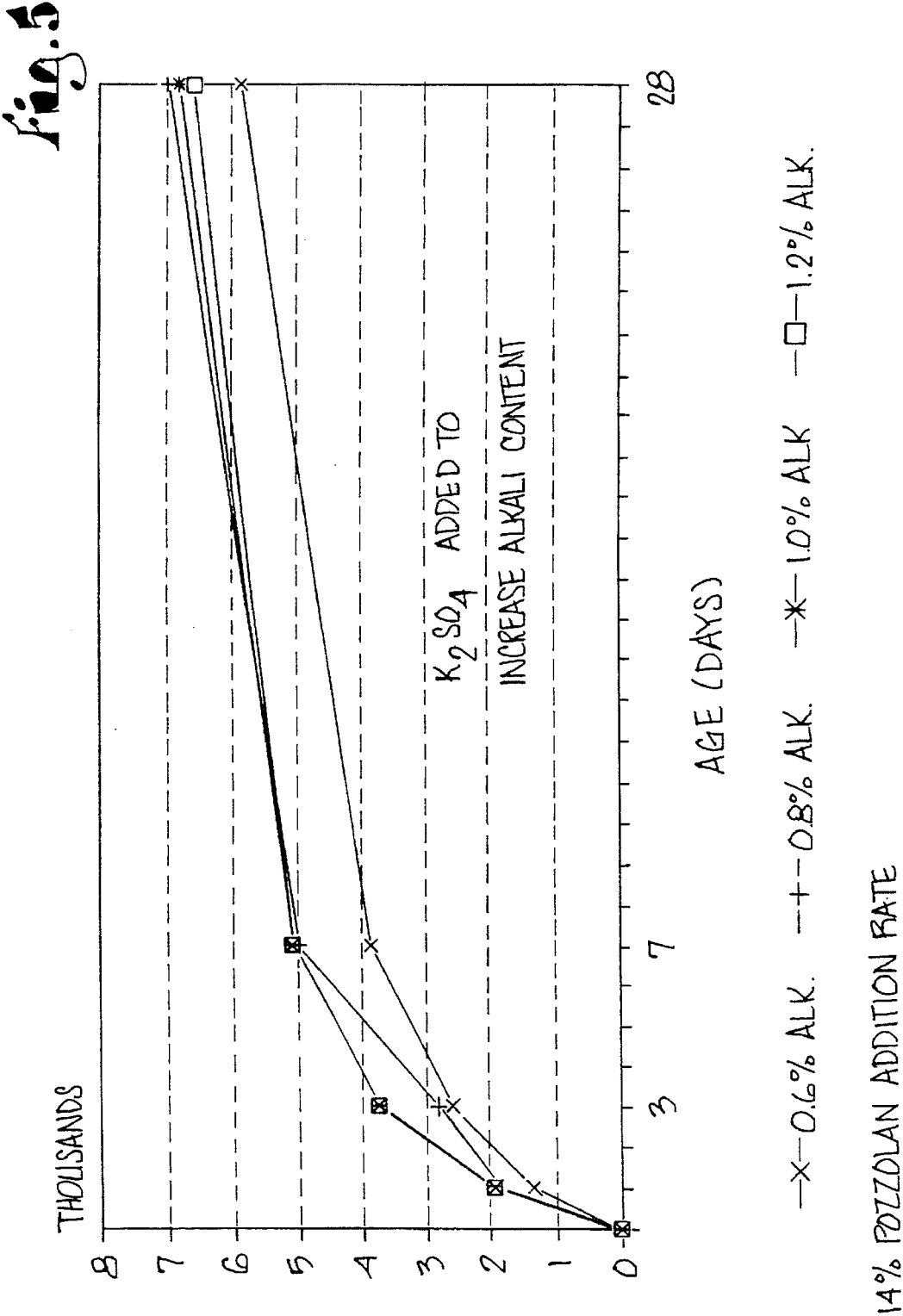

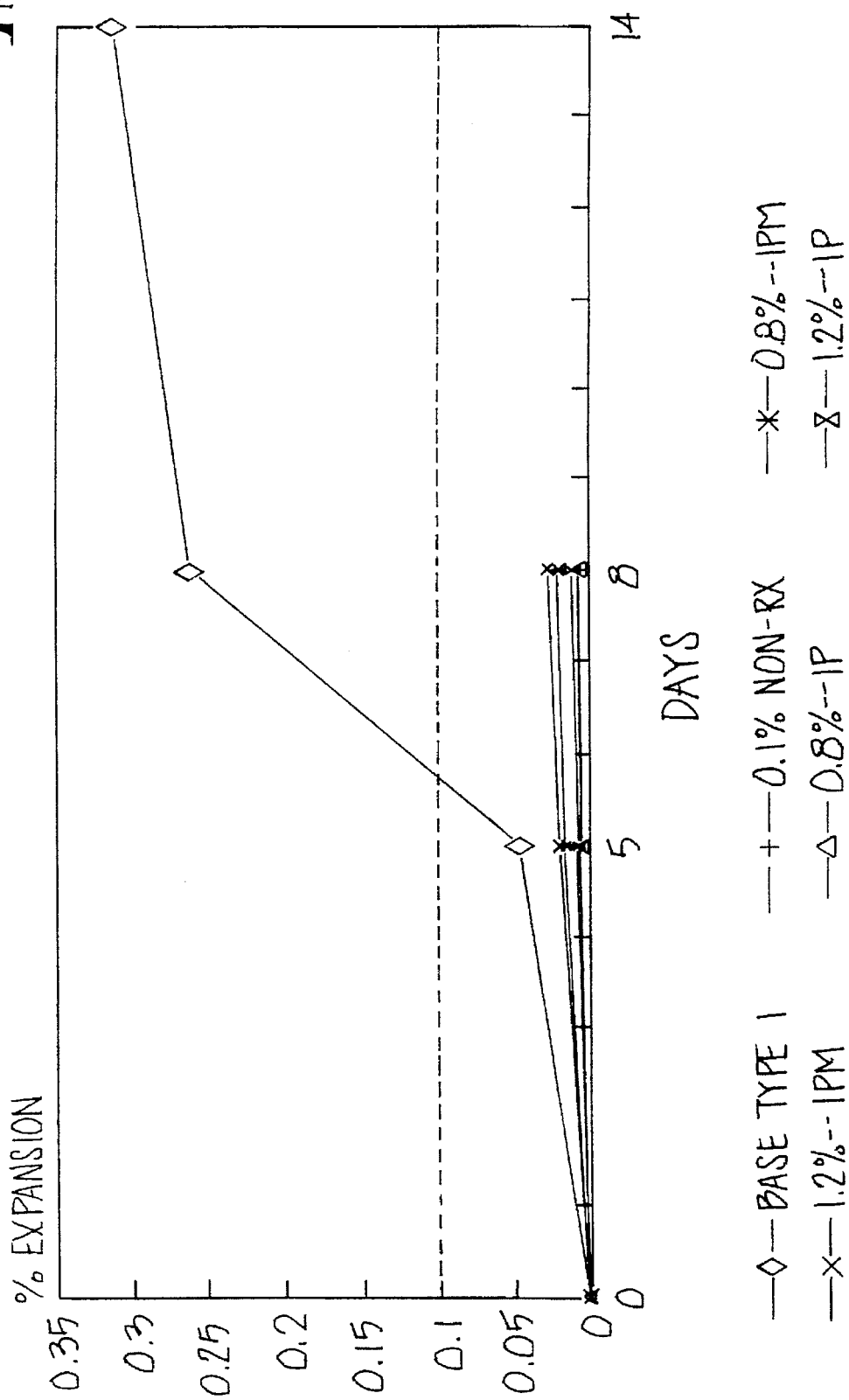

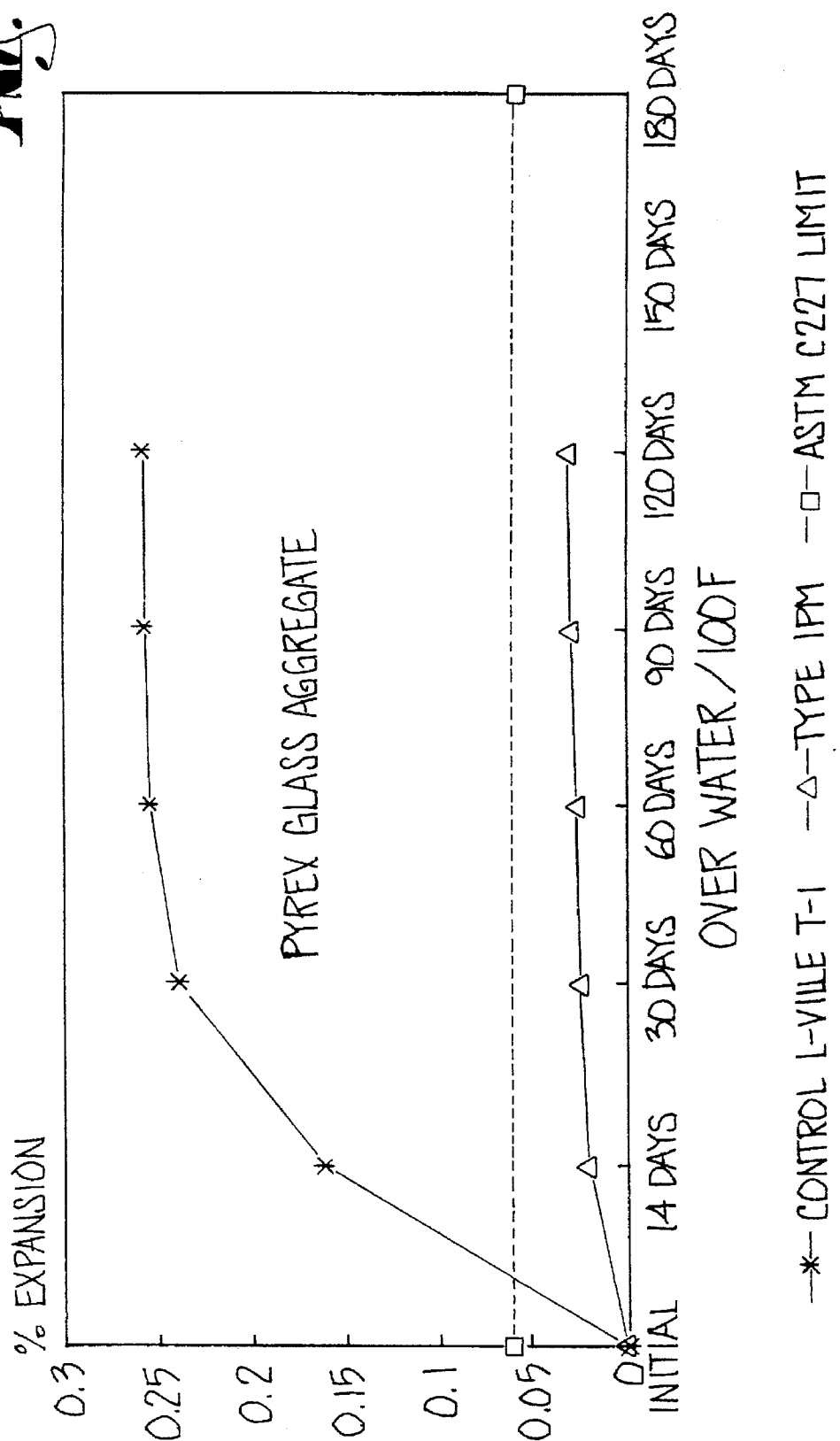

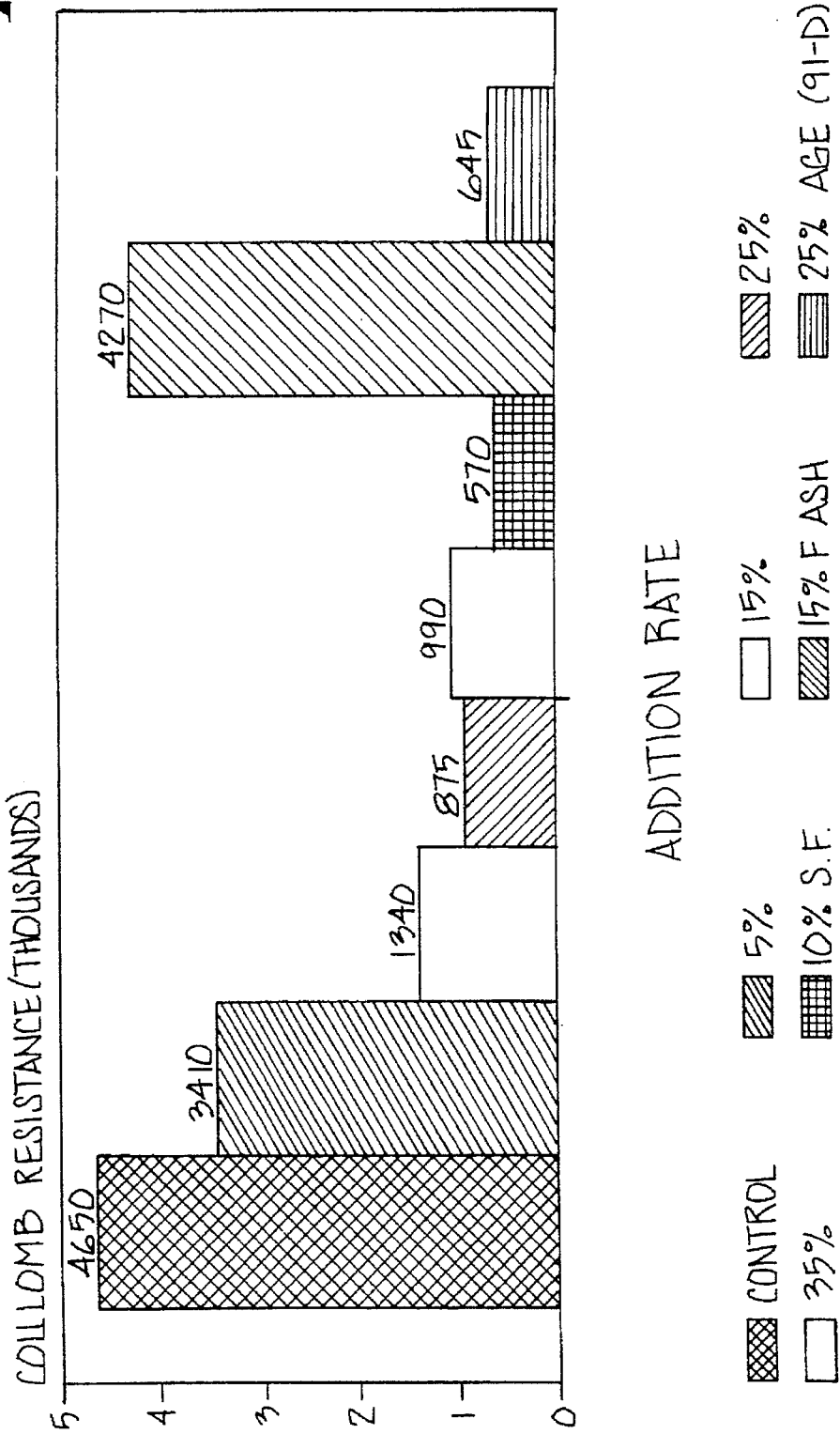

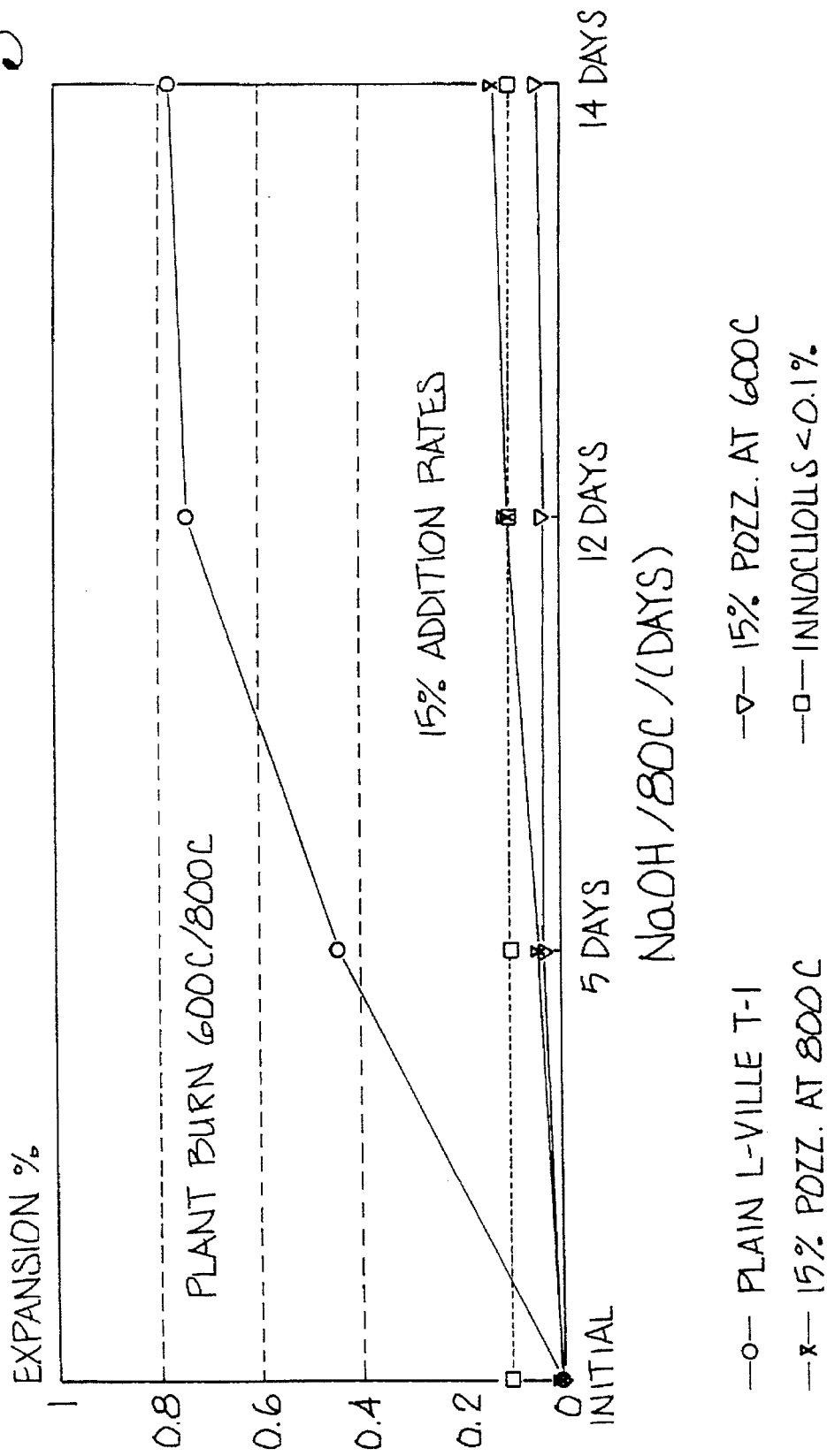

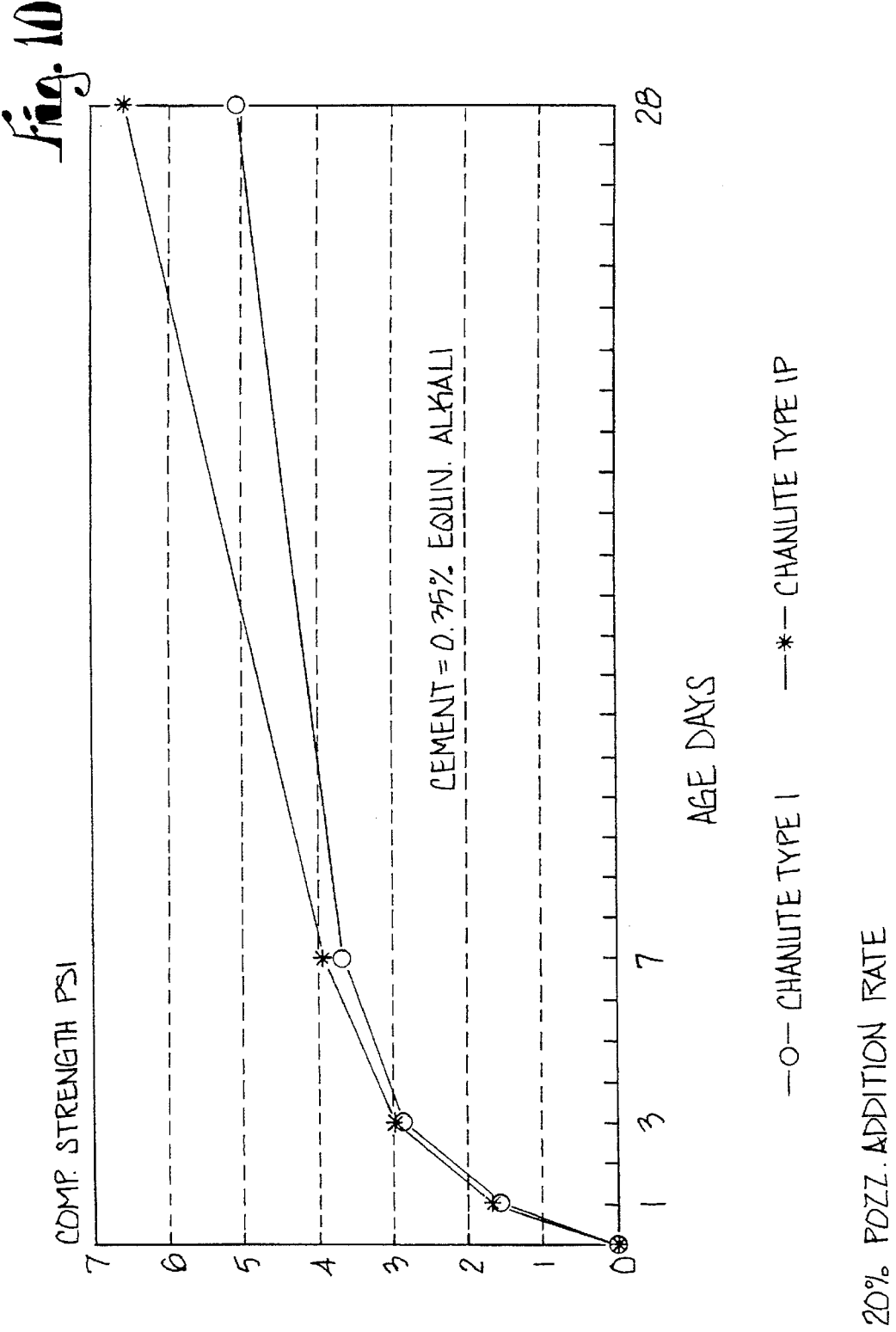

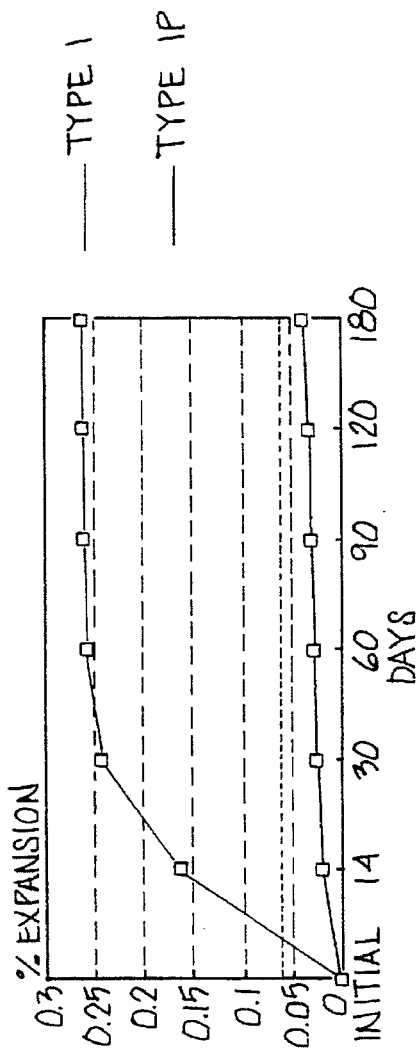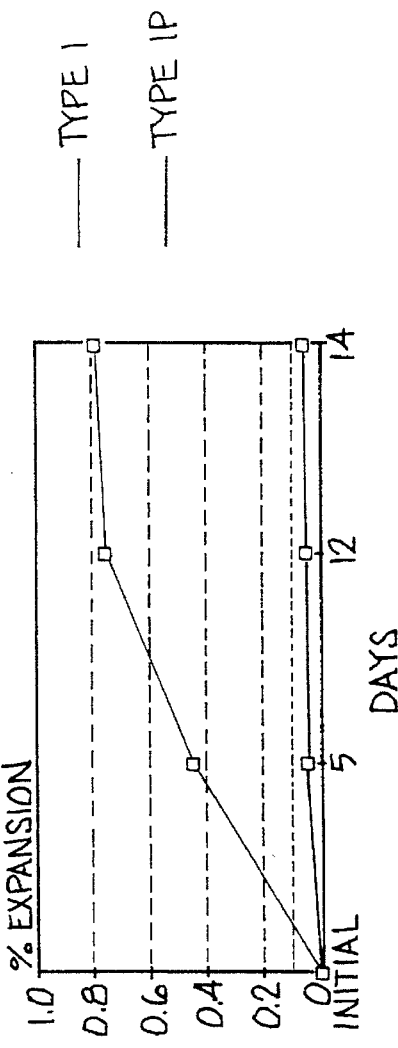
Fig. 11A
Fig. 11B

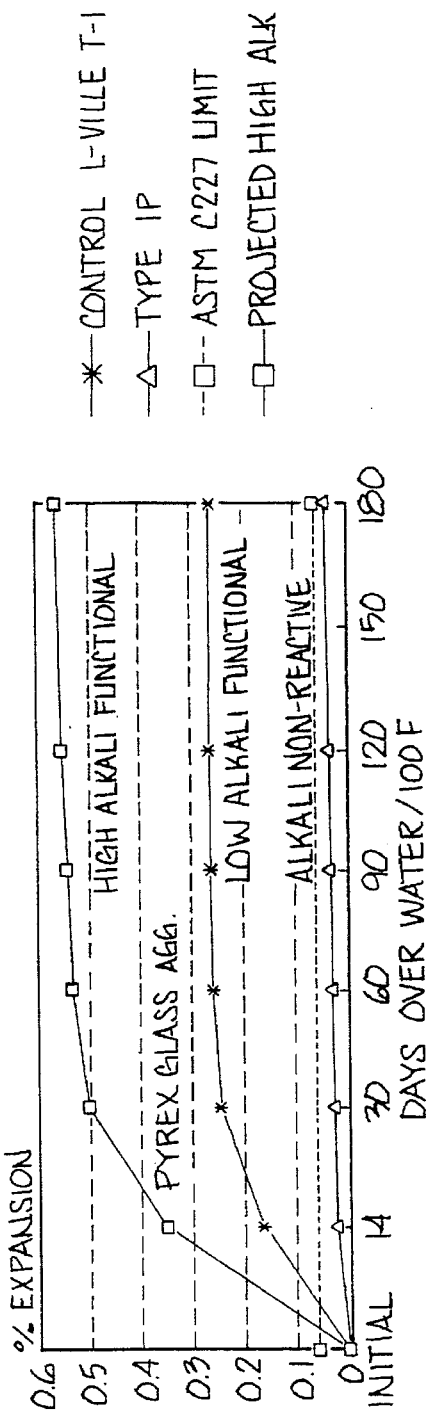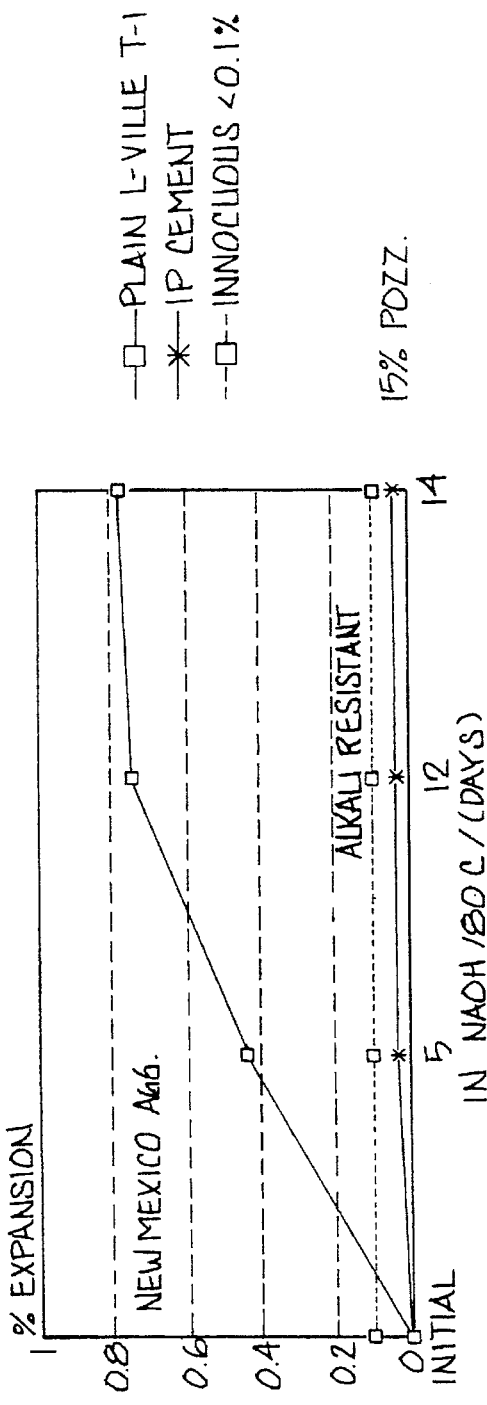

CEMENTITIOUS SYSTEMS AND NOVEL METHODS OF MAKING THE SAME

FIELD OF THE INVENTION

The invention is related to novel cementitious systems and novel methods of making the same. Concretes prepared from the improved cementitious systems of this invention exhibit the unprecedented and unexpected characteristics of: (1) a water demand of less than about 33% NC; (2) one-day strengths of at least about 1000 psi; and (3) low alkali functionality. By increasing the amount of calcined clay, the resulting cementitious system will also gain sequentially the following properties: (1) alkali non-reactiveness; (2) alkali resistance; and (3) low chloride permeability. Most cementitious systems of this invention are used in place of ordinary Portland cements as referenced in ASTM C 150-94, as well as being certifiable under ASTM C 1157-94 and C 595-94.

BACKGROUND INFORMATION

In the United States, cements are divided into the following categories: (1) Portland cement; (2) Natural cement; (3) High alumina cement; (4) Supersulphate cement; and (5) Special cements. This invention is generally related to an improved cementitious system for use in blended or masonry cements as a substitute for ordinary Portland cement.

To assist the reader in understanding the processes and compositions of this invention, a listing of terms and their basic definitions is set forth below, as well as a basic description of how ordinary Portland cement is prepared and tested. This information is not supplied as a limitation to the invention and should not be used as such. The scope and breadth of the invention is as set forth in the claims.

A. Definitions

Ordinary Portland cement is a hydraulic cement produced by pulverizing Portland cement clinker. Portland cements are classified under ASTM standards (C 150-94) into eight types, including:

Type I. For use in general concrete construction where the special properties specified for Types II, III, IV and V are not required.

Type II. For use in general concrete construction exposed to moderate sulphate action, or where moderate heat of hydration is required.

Type III. For use when high early strength is required.

Type IV. For use when low heat of hydration is required.

Type V. For use when high sulphate resistance is required.

Type IA, IIA and IIIA are the same as Types I, II, and III respectively except that they have an air entraining agent added. "Ordinary Portland cement" in the context of this patent covers all types (I–V and IA–IIIA) of Portland cement as referenced in ASTM C 150-94.

Cement clinker is the sintered product produced by the kiln system. In ordinary Portland cement, the clinker is generally a partially fused product consisting essentially of hydraulic calcium silicates.

Blended cement is generally a hydraulic cement comprising an intimate and uniform blend of ordinary Portland cement and pozzolanic materials produced by (1) intergrinding the ordinary Portland cement clinker with the pozzolanic materials; or (2) interblending ordinary Portland cement with the pozzolanic materials.

Masonry cement is a hydraulic cement for use in mortars for masonry construction. It contains one or more of the following materials: ordinary Portland cement, Portland blast-furnace slag cement, Portland-pozzolan cement, natural cement, slag cement or hydraulic limes. It also usually contains one or more materials such as hydrated lime, limestone, chalk, calcareous shell, talc, slag or clay.

Hydraulic cement is a cement that sets and hardens by chemical interaction with water and is capable of doing so under water.

A cementitious system is the total combined dry mixture of finely divided hydraulic and pozzolan materials for a concrete which reacts with water to form the binder in concrete.

Concrete is a construction material comprised of the cementitious system, water, admixtures, and aggregates.

Pozzolan is normally a siliceous or siliceous and aluminous material, which in itself possesses little or no cementitious value, but will, in finely divided form and in the presence of moisture, chemically react with calcium hydroxide at ordinary temperatures to form compounds possessing cementitious properties.

Blended pozzolan is a pozzolan blended with other components. The components may be any of several types of material, including: gypsum, alkali salts, hydrated kiln dust, hydrated lime, flyash, plasticizing agents, etc.

Slag is the common term for the non-metallic product, consisting essentially of silicates and aluminosilicates of calcium and other bases, that is developed in a molten condition simultaneously with iron in a blast furnace.

To calcine or calcining a material is to alter the composition or physical state of the material by heating the material to drive off volatile matter without fusing.

Intergrinding is the process of grinding the cement clinker and other additives to the desired fineness in a grinding mill.

Interblending is the process of adding materials to the cement after the cement clinker has already been ground in the grinding mill.

Normal consistency (nc) is the amount of water required to prepare cementitious systems to a given consistency as defined by ASTM C 187-94.

Efflorescence is the mechanism by which available alkalies are transported to masonry mortar surfaces and precipitate out upon drying to form a powered material. The precipitate is typically a sodium carbonate or calcium carbonate composition.

The property of low alkali functionality is the equivalent performance of a cementitious system to the performance of a low alkali Portland cement when tested by ASTM C 227-94 test methods. FIG. 12A illustrates the general performance of a low alkali cementitious system when tested by ASTM C 227-94.

The property of alkali non-reactiveness is when the cementitious system expands less than about 0.06% under the testing procedure of ASTM C 227-94. FIG. 12A illustrates the performance of an alkali non-reactive cementitious system when tested by ASTM C 227-94.

The property of alkali resistance is when cementitious systems have less than a about 0.08% expansion under ASTM C 1260-94 using a highly reactive aggregate. Alkali resistant cementitious systems offer protection from alkali attack far beyond that provided by low alkali functionality cementitious systems because alkali resistant cementitious systems actually protect the aggregate from attack. FIG. 12B illustrates the performance of an alkali resistant cementitious system.

A highly reactive aggregate is an aggregate that results in an expansion of about 0.6% or more under ASTM C 1260-94 using Type I Portland Cement. Highly reactive aggregates commonly used for testing are known as "New Mexico Aggregates" and "Canadian Spratt Aggregates."

A. Current Day Preparation of Ordinary Portland Cement

Ordinary Portland cement is generally prepared as schematically set forth in FIG. 1. The raw materials, which are generally comprised of limestone, sand, clay and iron ore, are fed proportionally into a grinding mill. In the grinding mill, the raw materials are ground to the desired fineness. After being ground, the raw materials are fed into the rotary kiln system for calcining.

After the feed passes through the rotating kiln, it is "cement clinker" and is passed over a clinker cooler which provides air to cool the cement clinker. The cement clinker is then passed into a grinding mill wherein gypsum is interground with the cement clinker to provide the ordinary Portland cement.

After being interground with the desired proportion of gypsum, the Portland cement is moved to bulk storage. The cement is then distributed to the customer.

When preparing ordinary Portland cement under conventional theories, typical grinding mills are fed two components, cement clinker and gypsum ($CaSO_4 \cdot 2H_2O$). In the grinding mill, each component absorbs energy proportional to the amount of each component in the mill. For example, if the feed is comprised of 94% clinker and 6% gypsum, the clinker would absorb 94% of the energy and the gypsum would absorb 6% of the energy. The surface area of each component after being ground by the grinding mill is a function of the energy absorbed and the grindability of the component absorbing the energy. As expected, gypsum is easier to grind than cement clinker. Consequently, since the cement clinker and the gypsum absorb equivalent energy, the gypsum will be ground finer, resulting in the gypsum having a higher surface area than the cement clinker. This is a desirable characteristic in ordinary Portland cement because gypsum acts as a retarder. As a retarder, it must be quickly soluble in water. Due to its high surface area after intergrinding, gypsum is highly soluble.

Conventional theory teaches to operate grinding mills to exploit this difference in surface area. This conventional method of exploiting the surface area difference between the cement clinker and the gypsum, or any other material that is interground, will be termed herein "differential grinding."

C. Test Methods

Various ASTM test methods are used in determining and quantifying the desirable and undesirable qualities of cementitious systems prepared from Portland and blended cements. Some of these test methods include: (1) ASTM C 227-94, which quantifies the effects of internal alkalies and can be used to determine if cementitious systems have the properties of low alkali functionality or alkali non-reactiveness; (2) ASTM C 1260-94, which can quantify the effects of external alkalies and determines if a cementitious system is alkali resistant; (3) ASTM C 109-94 quantifies the compressive strength of a cementitious system; and (4) ASTM C 1202-92 measures the permeability of the cementitious system to chloride ions. ASTM test methods and standards including ASTM C 227-94, C 1260-94, C 109-94, C 1202-94, C 150-94, C 1157-94, C 595-94, C 1012-94 and AASHTO T 277-94 and all other test methods or standards referenced herein are hereby incorporated by reference as if set forth in their entirety. The -94 following the ASTM test method number indicates that it is the ASTM method in effect during 1994.

Although the ASTM test methods are set out specifically, those skilled in the art may be aware of alternative methods which could be used to test for the referenced qualities or results. The only difference being, the results or qualities may be reported in a different manner wherein a conversion system could be used to give comparable results. Consequently, the invention should not be limited by the referenced test methods and the results thereof, but rather only to the claims as set forth below taking into account equivalent testing methods and results.

i. Effects on Concrete by Internal Alkalies

Aggregates used in concrete mixtures contain mineralogical components that will react with hydroxyl ions in the concrete pore solution and form silica hydroxide gels. These silica hydroxide gels absorb the alkali ions producing alkali-silica gels in the concrete matrix. The alkali-silica gels are capable of absorbing water which causes the gels to swell in the confined spaces of the hardened concrete. The swelling creates internal stresses which result in premature cracking of the concrete. The above described reaction of silica hydroxide gels ultimately absorbing $H_2O$ is termed "Alkali Silica Reactivity" (ASR).

ASR is a significant factor in the deterioration of concrete. Current teachings suggest that fewer alkali ions in the cement will decrease the occurrence of ASR. As a result, the cement specified for concrete that may experience ASR is currently limited to low alkali cement (less than about 0.40% to about 0.60% $Na_2O$ equivalent). To manufacture a low alkali cement, either uniquely low alkali raw materials must be utilized, which is usually uneconomical, or the Portland cement is processed in such a manner that the naturally occurring alkalies are evaporated and become concentrated in a byproduct stream known as cement kiln dust (CKD).

As shown in FIG. 1, when the raw materials are being processed in the kiln system, the high alkali CKD evolves and is removed and transported to landfills as waste materials. In some systems, the amount of CKD removed amounts to as much as 15% of the total input of raw materials. Thus, a kiln system capable of producing a million tons of cement clinker a year could produce 150,000 tons or more of high alkali CKD.

Although low levels of alkali are already required in some instances, lower limits of alkali content are being proposed by both state and federal highway departments in hopes of further reducing ASR. Using the current method of producing Portland cement, lower levels will translate into additional CKD being removed and discarded, directly resulting in higher fuel and raw material consumption, and increased expense for CKD removal, while possibly not solving the ASR problem if the alkali attack is from external sources such as deicing salts.

Additionally, the Environmental Protection Agency (EPA) is considering establishing substantial controls on the disposal of CKD, possibly classifying it as a hazardous waste which would be even more expensive for the cement producer to discard.

Consequently, a need exists for a method and/or composition which eliminates the need to remove some or all of the CKD from the kiln system, thus considerably reducing the cement producers' cost of production and addressing other environmental concerns related to the disposal of the CKD, while simultaneously solving the problem of ASR due to internal alkalies.

ASTMC 227-94 is utilized to determine the susceptibility of cementitious system/aggregate combinations to undergo ASR by measuring the increase or decrease in length of mortar bars prepared from the cementitious system/aggregate combination. The aggregate utilized in ASTM C 227-94 can be either the job aggregate or a very reactive reference aggregate such as pyrex glass.

By comparing the results of ASTM C 227-94 tests on cementitious systems to those of low alkali Portland cements, it can be determined whether the cementitious system has the property of low alkali functionality. If the cementitious system performs similar to a low alkali Portland cement in C 227-94, it is classified as having the property of low alkali functionality. FIG. 12A illustrates generally how a Type 1 low alkali Portland cement performs under the conditions of ASTM C 227-94.

If the expansion in ASTM C 227-94 is less than about 0.06%, then the cementitious system not only has the property of low alkali functionality, but is also alkali non-reactive. FIG. 11A illustrates the cementitious system of this invention, "Type 1P", which is alkali non-reactive as the expansion is less than about 0.06%. FIG. 12A also illustrates an alkali non-reactive cementitious system.

ii. Effects on Concrete by External Alkalies

External alkalies are such things as deicing salts, fertilizers or other chemicals placed on the lawn or ground next to the concrete, etc. External alkalies, like internal alkalies, can cause ASR expansion. Consequently, a need exists for a cementitious system that mitigates or at least minimizes ASR reactions due to external alkalies. A cementitious system that has these capabilities is termed an alkali resistant cementitious system.

ASTM C 1260-94 can be used to determine whether a cementitious system is resistant to external alkalies, and thus alkali resistant. Originally, ASTM C 1260-94 was developed to measure the susceptibility of aggregates, not the cementitious system, to alkali attack. In fact, C 1260-94 was originally thought to be independent of the type of cementitious system used. It has been found, however, that the cementitious systems of this invention can actually prevent the alkali from reacting with a highly reactive aggregate, such as a New Mexico aggregate, even under the very severe C 1260-94 test conditions. (See FIG. 11B.)

ASTM C 1260-94 simulates external alkalies by soaking a mortar bar specimen in a hot alkali solution. ASTM C 1260-94 measures the increase or decrease in length of mortar bar specimen to quantify the effects of the alkali on the mortar bar specimen. If the mortar bar specimen increases in size, ASR, as a result of external alkalies, has occurred, and therefore, external alkalies are adversely effecting the cementitious system. Meaning, the cementitious system is not alkali resistant. Comparatively, if the mortar bar specimen has an expansion of less than about 0.08%, the cementitious system is alkali resistant. Alkali resistant cementitious systems offer protection from external alkalies far beyond that provided even by low alkali cementitious systems. This is clearly illustrated in FIG. 11B. "Type 1" in FIG. 11B is the performance of a low alkali cementitious system under ASTM C 1260-94. "Type 1P" is the performance of a cementitious system of this invention which is alkali resistant.

iii. Compressive Strengths

ASTM C 109-94 measures the compressive strength of hydraulic cement mortars. The compressive strength is the measured maximum resistance of a mortar specimen to axial compressive loading normally expressed as force per unit cross-sectional area. In prior art mortars, which included calcined clays, the early compressive strengths during the first 7 days, and most markedly in the first day, are highly diminished.

The diminished strength is undesirable for several reasons. Initially, delay in early strength development results in surface cracking due to evaporation. Secondly, jobs take longer because the concrete form must remain in place substantially longer, and finishing is delayed.

Yet, cements containing calcined clays are desirable due to their enhanced long-term compressive strengths. Consequently, a need exists for a composition which incorporates calcined clay due to its beneficial attributes such as enhanced long-term compressive strengths, yet does not have the undesirable decreased early compressive strengths shown by prior art concretes containing pozzolanic materials.

iv. Chloride Permeability

AASHTO T 277-94 or ASTM C 1202-94 determines the electrical conductance of concrete to provide a rapid indication of its resistance to the penetration of chloride ions. The greater the chloride ion permeability, the greater the chance that the reinforcing steel will corrode and weaken. Consequently, a need exists for a composition with low chloride ion permeability such that the steel reinforcing materials do not corrode.

v. Water Requirement

ASTM C 187-94 measures the amount of water required for mixing with a cementitious system to obtain a desired consistency. In prior art cementitious systems which contained calcined clays, the clays caused an increase in water demand over the water demand of Ordinary Portland cement. The increased water demand was directly correlated to dramatic decreases in early compressive strengths of the prior art cementitious systems containing calcined clays with respect to Ordinary Portland cement. Consequently, a need exists for a cementitious system containing calcined clays which has a lower water demand and increased early compressive strength over that of prior art cementitious systems containing calcined clay.

PRIOR ART

Manufactured pozzolans are well-known for their application as functional additives to Portland cement. However, the reported results in literature clearly illustrate that prior art blended cements containing pozzolanic materials have undesirable depressed early compressive strengths. For example, ASTM C 595-94 classifies Portland cements containing pozzolans as Type P or Type IP. ASTM C 595-94 dictates that Type P should not be used in concrete construction where high early compressive strengths are required.

Literature also reports the use of flyash interground with the cement clinker to address ASR problems. The resultant concrete had such a high water demand and dramatically decreased early compressive strengths that it was found to be undesirable as well as uneconomical.

Other articles have been published on interblended cements which utilize calcined clays which have been separately ground using conventional grinding techniques to a fineness of about 8000 $cm^2/g$ (Blaine). These articles also confirm that these prior art blended cements utilizing calcined clays have dramatically decreased early compressive strengths in comparison to cementitious systems which do not incorporate pozzolan. See, Saad, et. al., *Properties of Mass Concrete Containing an Active Pozzolan Made from Clay*, Concrete International, July 1982.

For example, in the Saad article, early compressive strengths as compared to Ordinary Portland cement were decreased by nearly 50% at three days with psi levels of only about 156 psi (11 $kg/cm^2$=156.2 psi). In direct contrast, concretes prepared utilizing the cementitious system of this invention showed comparable one day compressive strengths to Ordinary Portland cements. See FIG. 10.

The prior art cementitious systems containing calcined clays had such poor performance, both economically and physically, that acceptance of any cementitious system containing calcined clay has not occurred. Current day teaching is that cementitious systems containing calcined clays require too much water and have early compressive strengths which are too low to be useable or economical. As a result, the inventors are not aware of any cementitious system containing calcined clay being marketed, sold or used with the exception of this invention.

Other articles illustrate that cementitious systems are detrimentally affected by numerous factors. Prior art cementitious systems have normally been able to address each detrimental factor individually with some success. Yet, no prior art cementitious system has been able to successfully address each factor in one cementitious system economically, especially a system containing calcined clays. In fact, in prior art cementitious systems, if one detrimental factor is successfully addressed, another factor is normally detrimentally affected or the cost causes the resultant cement to be uneconomical to use. For example, silica fume may be blended with the cement to address ASR problems, but the water demand increases undesirably and silica fume is expensive. Consequently, there is a need for an economical, cementitious system which meets all the following criteria: (1) previously unattainable resistance to internal alkalies by pozzolan containing systems such that the cementitious system can be classified as having the property of low alkali functionality or as alkali non-reactive; (2) previously unattainable resistance to external alkalies by pozzolan containing systems such that the cementitious system is alkali resistant; (3) comparable early compressive strengths to Ordinary Portland cements; and (4) reduced metal leaching and improved plastic state workability over current day Type 1 Portland cements.

SUMMARY OF THE INVENTION

Novel cementitious systems and methods of making the same comprised of gypsum, pozzolan, preferably calcined clay, and a clinker consisting essentially of hydraulic calcium silicates are disclosed which have the following properties: (1) a water demand of less than about 33% nc; (2) one day strengths of at least about 1000 psi (see FIGS. 2, 3 and 10); and (3) low alkali functionality. By increasing the amount of calcined clay, the resulting cementitious system will sequentially gain the following properties: (1) alkali non-reactiveness (see FIGS. 7 and 11A); (2) alkali resistance (see FIGS. 6, 9 and 11B); and (3) low chloride permeability (see FIG. 8).

The clay is soft fired. The clay, before being fired, is preferably selected from the group consisting of clays having an alkali content of less than 3.0% $Na_2O$ equivalent, an Fe content as calculated as $Fe_2O_3$ of less than about 5.0% and a quartz content not to exceed about 15%, kaolinites, montmorillonites, illites, halloysites, and mixtures thereof, with the preferred being kaolinite.

The clay is fired in either a rotary kiln or fluid bed reactor at a temperature sufficient to drive off approximately all of the bound water. The preferred temperature is from about 550° F. to about 750° F., more preferably from about 550° F. to 650° F.

Proportions used in this invention are about 4 to about 10 percent by weight of gypsum; about 3 to about 50 percent by weight of calcined clay; and about 40 to about 93 percent by weight of clinker consisting essentially of hydraulic calcium silicates. A sufficient amount of an alkali containing component to raise the alkali level in the cementitious system by about 0% to about 2.0% $Na_2O$ equivalent may also be added. The alkali containing component may come from several different sources. For example, (1) retaining at least a portion of the CKD in the rotary kiln, resulting in a cement clinker with a higher alkali content; (2) intergrinding or blending the cement clinker with hydrated kiln or lime kiln dust; (3) intergrinding or blending a compound high in available alkali with the interground cement clinker; or (4) a combination of all three. For clarification, in the instance wherein a portion of the CKD is maintained, the alkali level of the clinker is raised and thus a separate alkali containing component is not added because the CKD was the alkali containing component. The compounds high in available alkali include alkali salts such as KOH, $K_2CO_3$, $K_2SO_4$, $K_2Ca(SO_4)_2 \cdot (H_2O)_x$ and their sodium counterparts.

Another embodiment of this invention comprises flyash, gypsum, clay and a clinker consisting essentially of hydraulic calcium silicates. No other marketable systems are known which utilize both flyash and clay. This embodiment is extremely marketable and cost efficient as it allows the addition the flyash which decreases costs, while none of the above listed desirable characteristics are lost.

The invention also comprises a blended pozzolan for use with Portland cement for preparing cementitious systems, comprising, pozzolan, preferably calcined clay; and at least one of the components selected from the group consisting of: about 2 to about 30 percent by weight gypsum; about 0 to about 10 percent by weight of a compound high in available alkali; about 0 to about 25 percent by weight hydrated kiln dust; about 0 to about 20 percent by weight hydrated lime; about 0 to about 20 percent by weight hydrated lime kiln dust; about 0 to about 50 percent by weight flyash; and about 0 to about 5 percent by weight organic plasticizing agent. The pozzolan is present in sufficient quantities to yield a blended pozzolan with a sum total weight percent of 100. The blended pozzolan is blended with Portland cement in weight ratios of about 1:20 to about 1:1. Preferably about 1:2 to about 1:3.

The invention also comprises methods of preparing the cementitious systems of this invention. Although not wanting to be limited to one theory, applicant believes the unexpected and unprecedented results have been achieved by controlling the differential grinding of the cement clinker and calcined clay. A complete explanation of the novel process is set forth below in the detailed description.

BRIEF DESCRIPTION OF THE DRAWINGS

FIG. 4 illustrates graphically the test results of ASTM C 109-94 Compressive Strength Tests of cementitious systems of this invention which are prepared from high alkali cement clinker.

FIG. 5 graphically illustrates the results of Compressive Strength Tests on various cementitious systems of this invention with high alkali levels obtained by adding varying quantities of $K_2SO_4$.

FIG. 6 graphically illustrates test results of C 1260-94 (previously P-214) expansion tests run on cementitious systems of this invention which contain increased levels of alkali and pozzolan.

FIG. 7 graphically illustrates test results of ASTM C 227-94 expansion tests run on a Type 1 Portland cement having no pozzolan and a cementitious system of this invention containing 14.5% calcined clay.

FIG. 8 graphically illustrates the results of the AASHTO T 277-94 Rapid Chloride Permeability Test on various blended cements incorporating various pozzolanic materials. Included are cementitious systems of this invention.

FIG. 9 graphically illustrates the results of ASTM C 1260-94 (P-214) expansion tests run on cementitious systems of this invention wherein the clay was fired at various temperatures.

FIG. 10 graphically illustrates C 109-94 compressive strength data comparing a low alkali Type 1 Portland cement vs. a cementitious system of this invention containing 20% calcined clay.

FIG. 11A graphically illustrates ASTM 227-94 results on Type 1 Portland Cement vs. the cementitious system of this invention with 14.5% calcined clay. The Type 1 illustrates the performance of a low alkali cement. Type 1P illustrates the performance of an alkali non-reactive cement.

FIG. 11B graphically illustrates ASTM 1260-94 (previously P 214) results on Type 1 Portland Cement vs. the cementitious system of this invention containing 14.5% calcined clay.

FIG. 12A graphically illustrates a high alkali, low alkali and alkali non-reactive cementitious system.

FIG. 12B graphically illustrates an alkali resistant cementitious system.

DETAILED DESCRIPTION OF THE PREFERRED EMBODIMENT

Figure 1:
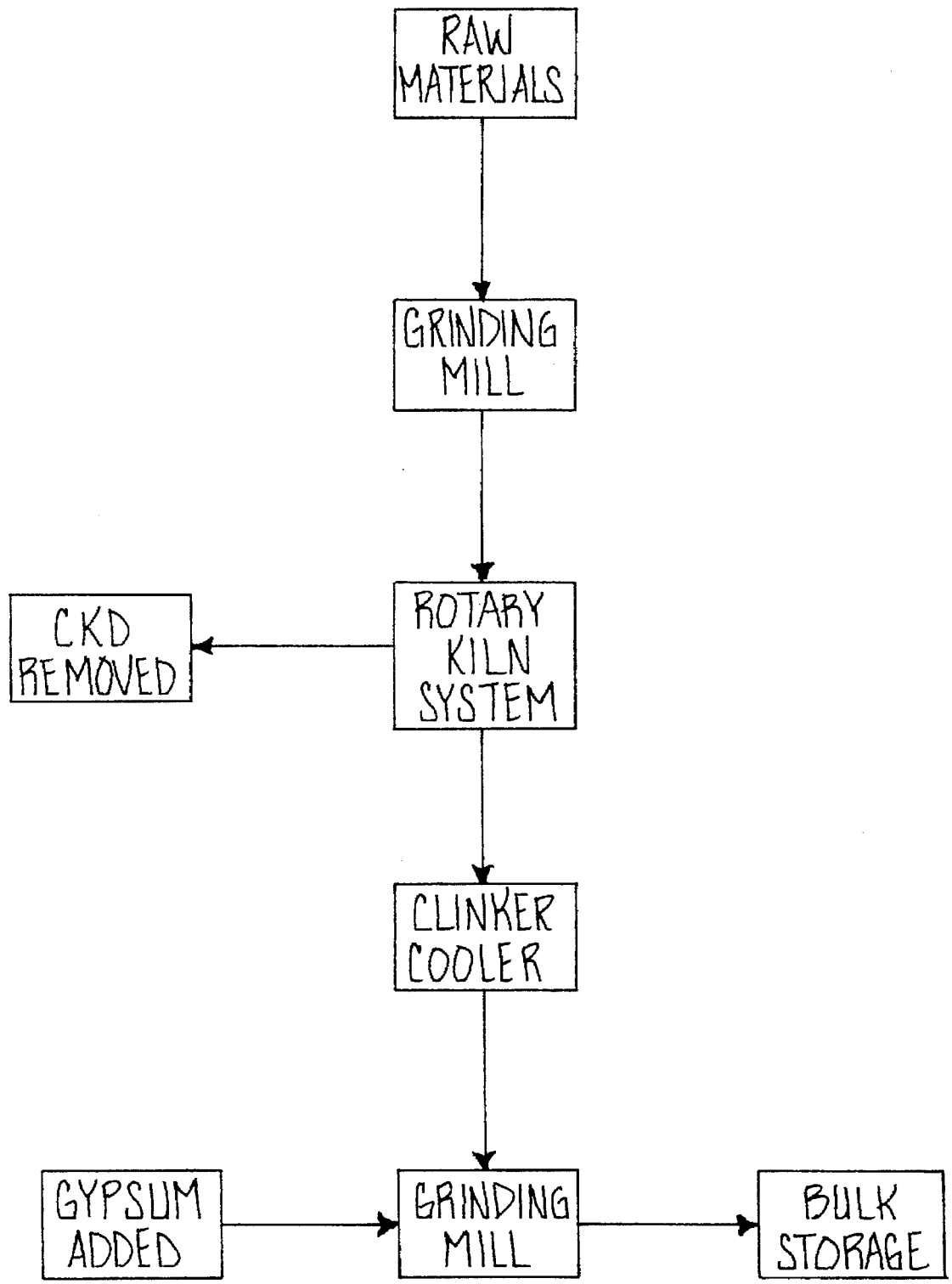
FIG. 1 is a schematic of the current day process of preparing ordinary Portland cement.

The invention comprises novel cementitious systems and novel methods of making the same. The novel methods control (1) the relative mean diameter of both the cement clinker and the calcined clay by controlling the differential intergrinding; (2) the temperature at which the clay is fired; and (3) the alkali content of the final cementitious system. By controlling these three factors, novel cementitious systems of this invention are prepared which exhibit (1) a water demand of less than about 33% NC; (2) one day strengths of at least about 1000 psi; and (3) low alkali functionality. By increasing the amount of calcined clay, the resulting cementitious system will sequentially gain the following properties: (1) alkali non-reactiveness; (2) alkali resistance; and (3) low chloride permeability.

A. Novel Methods of Making the Novel Cementitious Materials

The novel cementitious systems of this invention are obtained by controlling (1) the differential grinding between the cement clinker and the calcined clay such that the calcined clay is not ground so fine that it increases water demand but sufficiently fine to impart the desired performance properties; (2) the temperature at which the clay is fired; and (3) the alkali content.

The novel methods include (1) intergrinding calcined clay with the clinker; (2) interblending ground calcined clay with ground clinker; and (3) a combination of both.

The first process for preparing a cementitious system of this invention, comprises the steps of intergrinding gypsum and a clinker consisting essentially of hydraulic calcium silicates to yield an interground mixture using conventional mill processes; and interblending ground pozzolan with the interground mixture to yield a cementitious system having a water demand of less than about 33% nc as tested by ASTM C 187-94 or an equivalent thereof; and a one-day strength of at least about 1000 psi as tested by ASTM C 109-94 or an equivalent thereof.

The second method of preparing a cementitious system of this invention comprises the steps of intergrinding gypsum, pozzolan and a clinker consisting essentially of hydraulic calcium silicates in a mill at a reduced retention time to yield the cementitious system, wherein the differential grinding between the pulverized clinker, the pulverized pozzolan and the pulverized gypsum is reduced. The resulting cementitious system also has a water demand of less than about 33% nc as tested by ASTM C 187-94 or an equivalent thereof; and a one-day strength of at least about 1000 psi as tested by ASTM C 109-94 or an equivalent thereof.

The third process is a combination of both intergrinding and interblending, comprising the steps of intergrinding gypsum, pozzolan and a clinker consisting essentially of hydraulic calcium silicates in a mill at reduced retention times no yield an interground mixture wherein the differential grinding between the pulverized clinker, the pulverized pozzolan and the pulverized gypsum in the interground mixture is reduced; and then interblending ground pozzolan with the interground mixture to yield a cementitious system. The resulting cementitious system has a water demand of less than about 33% nc as tested by ASTM C 187-94 or an equivalent thereof; and a one-day strength of at least about 1000 psi as tested by ASTM C 109-94 or an equivalent thereof.

The pozzolans are preferably calcined clays which are low alkali, soft fired clays which before being fired are selected from the group consisting of clays having an alkali content of less than 3.0% $Na_2O$ equivalent, an Fe content as calculated as $Fe_2O_3$ of less than about 5.0% and a quartz content not to exceed about 15%, or are classified as kaolinites, montmorillonites, illites, halloysites. Mixtures of each are also capable of being used. The preferred clay is kaolinite. The low alkali, soft fired clay is fired at a sufficient temperature to drive off approximately all of the bound water, preferably at a temperature of about 550° C. to about 750° C., more preferably about 550° C. to about 650° C.

Optionally, the clay can be ground prior to calcining to reduce particle size and improve uniformity of heating of the mineral mass. Again, best results in terms of grindability and pozzolanic activity are obtained with low alkali clay that has been calcined at the minimum temperatures sufficient to effect full dehydroxylation of the clay matrix. See FIG. 9. The presence of unfired clay components is preferable to over fired, more crystalline forms such as mullite.

Using a conventional mill operation theory, when calcined clays are interground with the clinker, the resultant pulverized calcined clay is ground much finer than the cement clinker, i.e. differential grinding occurs, meaning the mean diameter particle size of the calcined clay is much smaller (i.e. surface area is much greater) than the mean diameter of the clinker. The calcined clay's greater surface area causes undesirable levels of water demand and thus low early compressive strengths than are desirable.

Conventional wisdom teaches if the cementitious system has low early compressive strengths, then all the raw materials must be ground finer to obtain the desirable early strengths. Following conventional wisdom, prior art milling operations wherein pozzolans were interground, would be altered to achieve a finer end product, which resulted in both a finer clinker and finer pozzolan. Yet, when tested, these prior art materials still had the high water demand which made them uneconomical and undesirable.

Contrary to conventional beliefs, the inventors have found that calcined clay does not require extremely fine particle size to impart early compressive strengths. Thus, a high amount of differential grinding when utilizing calcined clay is not desirable. Rather, the level of differential grinding should be controlled to effect a clinker with a fineness similar to that produced by conventional milling operations and a calcined clay fineness that does not detrimentally effect the water demand and one day strengths.

To control the level of differential grinding such that the clay is not ground too fine and the clinker is ground sufficiently, the inventors have found that the grinding mill must be run in a manner not optimum for ordinary Portland cement. This manner involves increasing the recirculating load and using milling techniques of very short retention times.

If the calcined clay is interblended with the clinker, the calcined clay is ground before interblending. Again, the mill is run at milling retention times not optimal for Ordinary Portland cement to effect a ground calcined clay that is not super fine such that it does not detrimentally affect the water demand.

By running the mills in this manner, novel cementitious systems of this invention have been prepared which have (1) a water demand of less than about 33% nc; (2) a one day strengths of at least about 1000 psi; and (3) low alkali functionality. By increasing the amount of calcined clay, the resulting cementitious system will sequentially gain the following properties: (1) alkali non-reactiveness; (2) alkali resistance; and (3) low chloride permeability.

Although not yet thoroughly investigated and not wanting to be bound by one theory, the inventors believe that grinding in this manner, i.e. in a manner not optimum for Portland cement, also imparts a more even particle size distribution. The inventors believe the more even particle size distribution may also be benefitting the cementitious systems made according to this novel process.

The second factor that must be controlled is the temperature at which the clay is calcined. The temperature is chosen such that the clay undergoes nearly complete dehydration while avoiding the collapse of the reactive clay structure. If the clay is heated to too high of temperatures, the amorphus structure of the clay will become crystalline and become unreactive. The preferred temperature is about 550° C. to about 750° C., more preferably about 550° C. to about 650° C.

Optionally, the clay can be ground prior to calcining to reduce particle size and improve uniformity of heating of the mineral mass. Again, best results in terms of grindability and pozzolanic activity are obtained with low alkali clay that has been calcined at the minimum temperatures sufficient to effect full dehydroxylation of the clay matrix. See FIG. 9. The presence of unfired clay components is preferable to over fired, more crystalline forms such as mullite.

A fact of heat transfer is that to heat the interior of a piece of clay in the calcining system sufficiently high to just dehydrate, the exterior of the piece of clay is somewhat higher in temperature. By grinding the clay before firing, and thereby obtaining a more equal particle size distribution, the difference between the surface temperature and interior temperature can be minimized thus decreasing the temperature necessary to cause dehydration and the likelihood that the amorphus structure of the clay will become crystalline and become unreactive. The high reactivity of the clay thus produced, reduces the amount of grinding the clay requires to give the desired performance. As discussed previously, the coarser clay requires less water, thus the higher reactivity at a coarser level will also minimize water demand.

Finally the alkali content of the system is also controlled. Contrary to ordinary Portland cements wherein alkali is detrimental for both strength development and concrete durability, alkali has been shown to be beneficial, to a point, in cementitious systems made in accordance with this invention. (See FIGS. 4, 5, and 6). Because the alkali reacts with the calcined clay, the cementitious systems of this invention show low alkali functionality at alkali levels of over about 0.6 to about 2.0% $Na_2O$ equivalent. These results are unprecedented. Furthermore, the properties of alkali non-reactiveness, alkali resistance and low chloride permeability are imparted as the calcined clay fraction is increased over that required for low alkali functionality.

The alkali content of the system is controlled by the addition of an alkali containing component to the cementitious system. The alkali containing component may come from several different sources. For example, (1) retaining at least a portion of the CKD in the rotary kiln, resulting in a cement clinker with a higher alkali content; (2) intergrinding or interblending the cement clinker with hydrated kiln or lime kiln dust; (3) intergrinding or interblending a compound high in available alkali with the interground cement clinker; or (4) a combination of all three. The compounds high in available alkali include alkali salts such as KOH, $K_2CO_3$, $K_2SO_4$, $K_2Ca(SO_4)_2 \cdot (H_2O)_x$ and their sodium counterparts.

B. The Novel Cementitious Systems

The novel cementitious system of this invention are generally comprised of gypsum, pozzolan, preferably calcined clay, and a clinker consisting essentially of hydraulic calcium silicates. The improved cementitious system has a water demand of less than about 33% nc as tested by ASTM C 187-94 and a one-day strength of at least about 1000 psi as measured by ASTM C 109-94. The preferred embodiments of the cementitious system of this invention also perform comparatively to a low alkali cement when tested in accordance with ASTM C 227-97 using a pyrex glass aggregate, such that the cementitious system can be classified as having the property of low alkali functionality. With increasing amounts of calcined clay, the cementitious systems of this invention also have a mortar bar expansion due to internal alkalies of less than about 0.06 percent as tested by ASTM C 227-97 using a pyrex glass aggregate such that the cementitious system is alkali non-reactive; have mortar bar expansion due to external alkalies of less than about 0.08 percent as tested by C 1260-94 using a highly reactive aggregate such that the cementitious system is alkali resistant; and have a chloride permeability as measured by AASHTO T-277-94 at a 0.40 water-to-cementitious ratio of not greater than about 2000 coulombs such that the cementitious system exhibits low chloride permeability.

The calcined clay, including the preferred clay, is discussed above. As stated earlier in this section, the clay is either interground with the clinker or is ground separately and blended with the clinker, or is added via a combination of both.

Proportions used in this invention to impart the desired properties are about 4 to about 10 percent by weight of gypsum; about 3 to about 50 percent by weight of calcined clay; and about 40 to about 93 percent by weight of clinker consisting essentially of hydraulic calcium silicates. A sufficient amount of an alkali containing component to raise the alkali level in the cementitious system by about 0% to about 2.0% $Na_2O$ equivalent may also be added. The alkali containing component may come from several different sources. For example, (1) retaining at least a portion of the CKD in the rotary kiln, resulting in a cement clinker with a higher alkali content; (2) intergrinding or blending the cement clinker with hydrated kiln or lime kiln dust; (3) intergrinding or blending a compound high in available alkali with the interground cement clinker; or (4) a combination of all three. The compounds high in available alkali include alkali salts such as KOH, $K_2CO_3$, $K_2SO_4$, $K_2Ca(SO_4)_2 \cdot (H_2)_x$ and their sodium counterparts.

The embodiments wherein CKD is maintained in the system are the most environmentally and economically significant. By retaining the CKD in the kiln system and producing high alkali clinker, millions of tons of CKD previously transported as waste to landfills is maintained in the system. The retention of CKD also decreases fuel and raw material consumption, and allows the use of lower cost, high alkali raw materials, all of which directly decreases the cost of production.

These percentages also allow for the addition of more gypsum than is normally added to the cement clinker. Although not wanting to be bound by one theory, it is believed that the higher $SO_3$ levels (gypsum) assist in increasing the early compressive strengths and improved sulfate resistance, while not affecting the water demand.

The preferred percentages for this embodiment are about 4 to about 8 percent by weight of gypsum; about 15 to about 25 percent by weight of calcined clay; about 67 to about 81 percent by weight of pulverized clinker consisting essentially of hydraulic calcium silicates; and a sufficient amount of an alkali containing component to raise the alkali level of said cementitious system by about 0.4 to about 2.0% $Na_2O$ equivalent.

A second embodiment of this invention exhibits the property of low alkali functionality. It is comprised of about 4 to about 10 percent by weight gypsum; about 3 to about 25 percent by weight calcined clay; about 65 to about 93 percent by weight pulverized clinker consisting essentially of hydraulic calcium silicates; and a sufficient amount of an alkali containing component to raise the alkali level in the cementitious system by about 0% to about 2.0% $Na_2O$ equivalent. In this embodiment, the water demand is less than about 33% nc as tested by ASTM C 187-94 or an equivalent thereof; has a one-day strength of at least about 1000 psi as tested by ASTM C 109-94 or an equivalent thereof; and performs similar to a low alkali cement when tested in accordance with ASTM C 227-94 using a pyrex glass aggregate.

The preferred percentages for the second embodiment are about 4 to about 8 percent gypsum; about 5 to about 15 percent calcined clay; about 77 to about 91 percent pulverized clinker consisting essentially of hydraulic calcium silicates; and a sufficient amount of an alkali containing component to raise the alkali level of the cementitious system by about 0.4 to about 2.0% $Na_2O$ equivalent. The calcined clay and alkali are the same as discussed above.

A third embodiment of this invention is alkali non-reactive. It is comprised of about 4 to about 10 percent by weight of gypsum; about 7 to about 35 percent by weight of calcined clay; about 55 to about 89 percent by weight of pulverized clinker consisting essentially of hydraulic calcium silicates; and a sufficient amount of an alkali containing component to raise the alkali level in said cementitious system by about 0% to about 2.0% $Na_2O$ equivalent. The third embodiment has a water demand of less than about 33% nc as tested by ASTM C 187-94; a one-day strength of at least about 1000 psi as tested by ASTM C 109-94 or an equivalent thereof; and an expansion in mortar bar length which does not exceed about 0.06 percent as measured by ASTM C 227-94 utilizing a pyrex glass aggregate.

The preferred composition for the third embodiment is about 4 to about 8 percent by weight of gypsum; about 10 to about 25 percent by weight of calcined clay; about 67 to about 86 percent by weight of pulverized clinker consisting essentially of hydraulic calcium silicates; and a sufficient amount of an alkali containing component to raise the alkali level of the cementitious system by about 0.4 to about 2.0% $Na_2O$ equivalent. The calcined clay, and alkali are the same as discussed above.

The fourth embodiment is a cementitious system which is alkali resistant to external alkalies. This embodiment has a water demand of less than about 33% nc as tested by ASTM C 187-94 or an equivalent thereof; a one-day strength of at least about 1000 psi as tested by ASTM C 109-94 or an equivalent thereof; and an expansion in mortar bar length which does not exceed about 0.08 percent as measured by ASTM C 1260-94 using a highly reactive aggregate or an equivalent thereof. The fourth embodiment is comprised of about 4 to about 10 percent by weight of gypsum; about 10 to about 50 percent by weight of calcined clay; about 40 to about 84 percent by weight of pulverized clinker consisting essentially of hydraulic calcium silicates; and a sufficient amount of an alkali containing component to raise the alkali level in the cementitious system by about 0% to about 2.0% $Na_2O$ equivalent.

The preferred percentages for the fourth embodiment are about 4 to about 8 percent by weight of gypsum; about 12 to about 30 percent by weight of calcined clay; about 62 to about 81 percent by weight of pulverized clinker consisting essentially of hydraulic calcium silicates; and a sufficient amount of an alkali containing component to raise the alkali level of the cementitious system by about 0.4 to about 2.0% $Na_2O$ equivalent. Again, the preferred calcined clay and alkali containing component are as discussed above.

The second, third and fourth embodiments show increasing resistance to alkalies. Although not wanting to be bound by one theory, the inventors believe the increasing resistance is a result of the increased levels of calcined clay in the cementitious system.

The fifth embodiment of this invention is highly marketable cementitious system which incorporates both calcined clay and flyash. To date, no material is sold which allows the addition of flyash to a material already containing a pozzolan without undesirable increases in water demand and decreases in early compressive strength. Furthermore, the availability of adding flyash also makes the cementitious system very economical.

Like the preceding embodiments, the fifth embodiment has a water demand of less than about 33% nc and a one-day compressive strength of at least about 1000 psi. It also meets all the standard and optional performance requirements for a Type GU as classified by ASTM C 1157-94 or an equivalent thereof, as well as all the performance requirements under Option R and Type MS as set forth in ASTM 1157-94.

The fifth embodiment is comprised of about 4 to about 10 percent by weight of gypsum; about 10 to about 35 percent by weight of calcined clay; about 43 to about 81 percent by weight of pulverized clinker consisting essentially of hydraulic calcium silicates; a sufficient amount of an alkali containing component to raise the alkali level in the cementitious system by about 0% to about 2.0% $Na_2O$ equivalent; and about 5 to about 20 percent by weight flyash.

The preferred percentages are about 6 percent by weight of gypsum; about 15 to about 20 percent by weight of calcined clay; about 59 to about 69 percent by weight of pulverized clinker consisting essentially of hydraulic calcium silicates; a sufficient amount of an alkali-containing component to raise the alkali level of the cementitious system by about 0.7% to about 1.0% $Na_2O$ equivalent; and about 10 to about 15 percent flyash. The flyash is either a Type C or Type F meeting ASTM C 618-94 specification for Type C and Type F flyash. The alkali and calcined clays are as discussed above.

The invention also comprises a blended pozzolan for use with Portland cement for preparing a cementitious system. The blended pozzolan comprises calcined clay and at least one of the components selected from the group consisting of about 2% to about 30% gypsum; about 0% to about 10% of a compound high in available alkali; about 0% to about 25% hydrated kiln dust; about 0% to about 20% hydrated lime; about 0% to about 20% hydrated lime kiln dust; about 0% to about 50% flyash; and about 0% to about 5% organic plasticizing agent. The calcined clay is present in sufficient quantities to yield a blended pozzolan with a sum total weight percent of 100. The blended pozzolan is blended with the Portland cement in weight ratios of about 1:20 to about 1:1, with the preferred being about 1:2 to about 1:3.

The invention also comprises improvements for masonry cement and masonry mortars. The masonry cement is comprised of Portland cement, limestone, gypsum and an air entraining system. The improvement is the substitution of about 0.1 to about 50 percent by weight of the Portland cement with pozzolan. The preferred pozzolan being calcined clay as discussed above.

For masonry mortar comprised of Ordinary Portland cement and hydrated lime, the improvement being the replacement of at least a portion of the hydrated lime with a ground or blended pozzolan. The blended pozzolan is preferably that discussed above. The ground pozzolan is preferably ground calcined clay.

The inventors believe the novel compositions exhibit both pozzolanic and zeolitic reactivity. By zeolitic reactivity, it is meant that cations or metal ions, typically Na of K, are stabilized in the conversion of the alumino silicate to an alkali alumino silicate. If the cations are stabilized, they are no longer available for ASR reactions. Consequently, having zeolitic reactivity is a preferable characteristic.

By pozzolanic reactivity, it is meant that the silica of the pozzolan reacts with the $Ca(OH)_2$ of the cementitious system to form calcium-silicate hydrate (CSH) gel. CSH gel is the primary strength producing reaction product in Portland cement or Portland cement systems which contain pozzolans. If the CSH gel has a low Ca to silica ratio, the CSH gel can also absorb alkalies into its matrix, reducing the availability of those alkalies for the detrimental ASR reactions. Consequently, pozzolanic reactivity is also a preferable characteristic.

Finally, the cementitious systems of this invention have also shown resistance to metal leaching which could have significant benefits in environmental related applications.

The examples below illustrate and discuss the various compositions.

EXAMPLE 1

Referring to FIG. 4, a comparison of early compressive strengths of a commercially available high alkali Portland cement "base cement" and a blend of the base cement with 15% by weight of pozzolan was carried out utilizing ASTM Test Method C 109-94. The base cement had an alkali content of 0.95 sodium oxide equivalent. The pozzolan was ground to a fineness of 98% -325 mesh. Both the base cement and the pozzolan were ground comparatively to cementitious systems prepared by the novel methods of this invention. The cement/pozzolan blend at days 1, 3, 7 and 28 exhibited increases in compressive strength of 34%, 16%, 24%, and 26% respectively in comparison to the base cement. These results indicate that a higher alkaline cement can be used with no adverse effects on the compressive strength. This is an important discovery in reference to environmental and economic concerns. The use of a higher alkaline clinker allows the cement producer to retain at least some of the CKD in the system. Thus, less CKD must be disposed of relieving environmental concerns while fuel and raw material consumption is reduced alleviating economic concerns.

EXAMPLE 2

Referring to FIG. 5, the compressive strengths of four cement blend compositions were measured in accordance with ASTM Test Method C 109-94. The blended cement compositions each contained 14.5% pozzolan ground to a fineness of >12,000 $cm^2/g$ (Blaine). Both the base cement and the pozzolan were ground comparatively to cementitious systems prepared by the new method of this invention. The total alkalinity of the respective blends was adjusted to 0.6%, 0.8%, 1.0% and 1.2% sodium oxide equivalent, respectively, utilizing potassium sulfate to increase alkali content. The results illustrated in FIG. 5 confirm that early compressive strengths are enhanced with alkali values above 0.6% $Na_2O$ equivalent. Like Example 1, these results confirm that compressive strengths are actually optimized by using a high alkali cement, which is greatly desired due to environmental and economic concerns.

EXAMPLE 3

Referring to FIG. 6, five cementitious compositions were prepared and tested in accordance with ASTM C 1260-94 (formerly ASTM P-214) to assess percent expansion as an indicator of undesirable effects of external alkalies. The "Base Type I" cement was a Type I Portland cement with no pozzolan added. "1P" was a blend of the same Type 1 and 25% by weight calcined clay ground to a fineness of at least 12000 $cm^2/g$. "1PM" was a blend of the same Type 1 and 15% by weight calcined clay ground to a fineness of at least 12000 $cm^2/g$. Both the base cement and the pozzolan were ground comparatively to cementitious systems prepared by the new method of this invention. The alkalinity of both blended cements was also adjusted to 0.8 and 1.2% to simulate full CKD return. The data showed no deleterious expansion for any of the alkali containing test blends whereas the Base Type I showed excessive expansion. In fact, these results are unprecedented in that they show the cementitious system incorporating the pozzolan and the increased alkali actually protect the aggregate from alkaline attack. The results show that cementitious systems of this invention are alkali resistant, including those cementitious systems high in alkali.

EXAMPLE 4

Referring to FIG. 7, "Control L-VILLE T-1" is a commercially available Type 1 cement having a total alkalinity of 0.58% sodium oxide equivalent; Type 1PM is a blend of the Control L-Ville T-1 and 14.5% by weight of pozzolan ground to a fineness of 4200 cm²/g. Both the base cement and the pozzolan were ground comparatively to cementitious systems prepared by the new method of this invention. Both samples were tested for ASR expansion via ASTM Test Method C 227-94 using pyrex glass aggregate. The Type 1PM blend exhibited no deleterious expansion over the 120-day test period whereas the Type 1 cement did. The dotted line on FIG. 7 is the ASTM C 227-94 test limit. The results confirm that the Type 1PM blend reduced ASR to acceptable levels.

EXAMPLE 5

Figure 2:
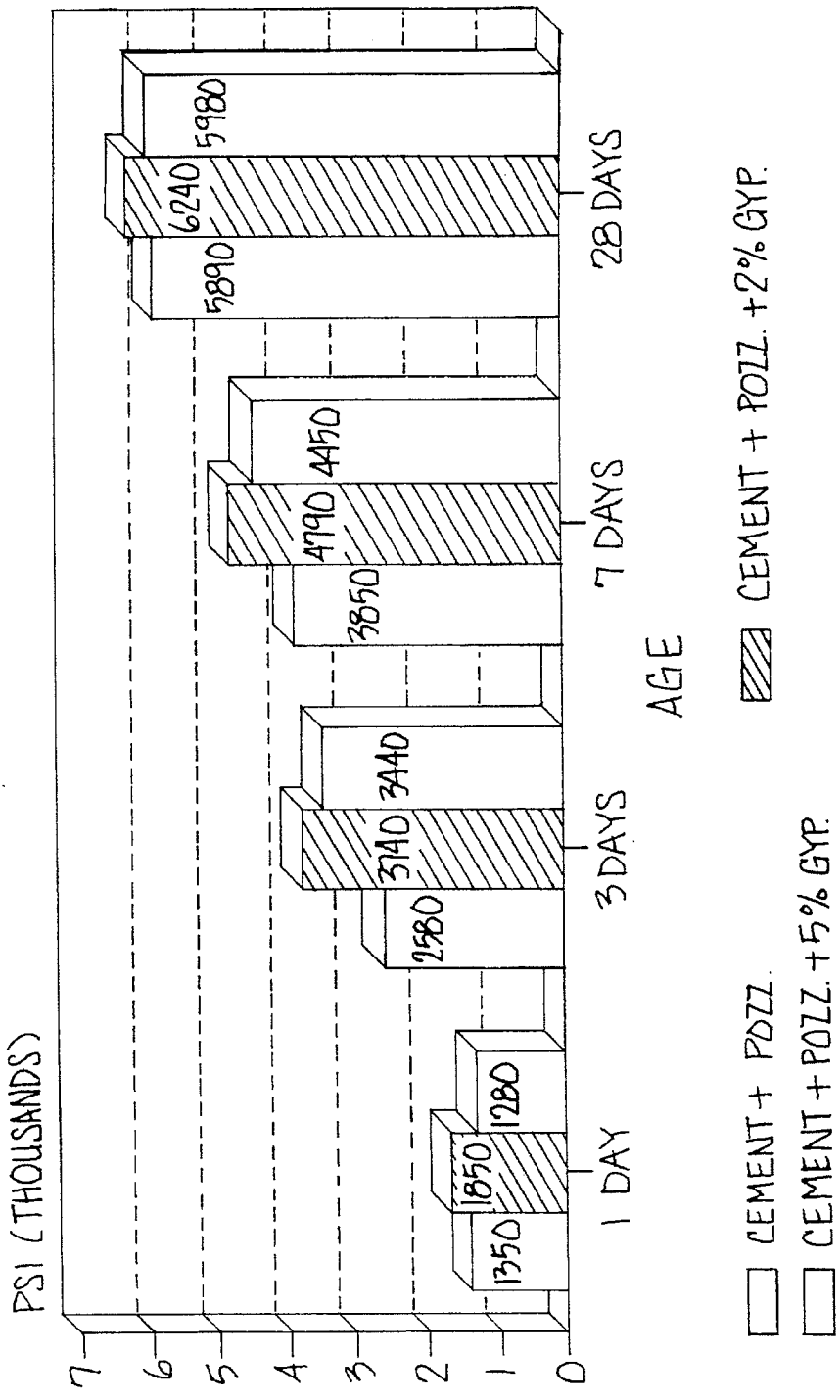
FIG. 2 illustrates graphically the results of C 109 Compressive Strength tests run on three materials including: (1) a cementitious system of this invention containing 14.5% by weight calcined clay; (2) a cementitious system of this invention containing 14.5% by weight calcined clay and 2% by weight added gypsum; and (3) a cementitious system of this invention containing 14.5% by weight calcined clay and 5% by weight added gypsum.

Referring to FIG. 2, three cement blends were subjected to comparative compressive strength testing by ASTM Test Method C 109-94. The blends included: (1) commercial Portland cement and 14.5% calcined clay; (2) Portland Cement, 14.5% by weight calcined clay, and 2% gypsum; and (3) Portland Cement, 14.5% by weight calcined clay, and 5% gypsum. Both the Portland cement and the calcined clay were ground comparatively to cementitious systems prepared by the new method of this invention. As FIG. 2 illustrates, generally, the concrete containing 2% by weight of added gypsum exhibited the highest compressive strengths at each of one day, three days, seven days, and 28 days in the test. These results confirm that adding more gypsum to the cementitious system than is normally interground with the cement clinker optimizes the early compressive strength of the cementitious system.

EXAMPLE 6

Figure 3:
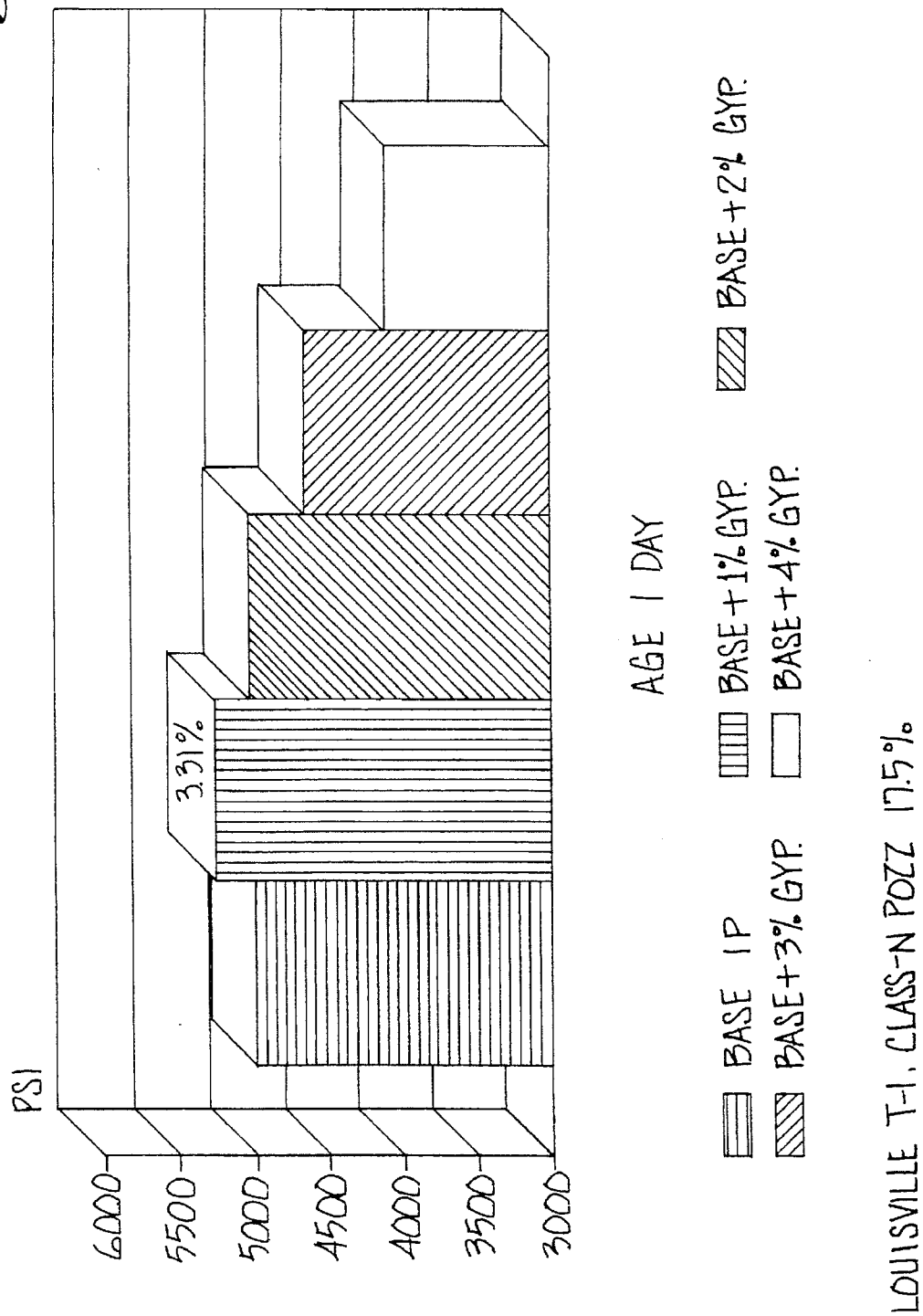
FIG. 3 illustrates graphically optimum $SO_3$ content for optimum compressive strengths of cementitious systems of this invention.

Referring to FIG. 3, a comparative test similar to Example 5 was carried out to assess the comparative compressive strengths of cement blends of "Base 1P" blend comprised of Louisville T-1 cement with 17.5% by weight calcined clay ground to a fineness of 4400 cm²/g. The Base 1P was manufactured under the methods of this invention. Blended formulations were prepared by interblending the "Base 1P" blend with 1%, 2%, 3%, and 4% by weight gypsum. As reflected in FIG. 3, the cement blend of the base and 1% gypsum exhibited the highest one day compressive strength. This proves that compressive strengths are optimized by adding more gypsum, approximately 1% more.

EXAMPLE 7

Referring to FIG. 8, a Type I Portland cement designated as the "Control", four calcined clay/Portland cement blends at 5%, 15%, 25% and 35% by weight and two other pozzolan modified blends, one containing 10% by weight silica fume "10% S.F." and one containing 15% by weight Class F flyash "15% F Ash" were prepared and tested by the rapid chloride permeability method AASHTO T-277. The four calcined clay/Portland cement blends were prepared comparatively to cementitious systems of this invention. FIG. 8 illustrates the blends of Portland cement and finely ground calcined clay at 15, 25 and 35 weight percent had dramatically reduced permeability properties similar to concrete prepared utilizing the silica fume modified cement. Such is indicative that the finely ground, low alkali calcined clays can reduce chloride permeability which decreases corrosion of the steel reinforcing materials.

EXAMPLE 8

Referring to FIG. 9, ASTM C 1260-94 (previously ASTM P 214) was run on a Plain L-Ville T-1 cement, and 2 blends of the Plain L-Ville T-1 cement and 15% by weight calcined clay. In one blend, the clay was fired at 800° C. In the other blend, the clay was fired at 600° C. Both the base cement and the pozzolan were ground comparatively to cementitious systems prepared by the new method of this invention. As FIG. 9 reflects, the blend containing the lower fired clay was the only material to pass the C 1260-94 test. This illustrates that the clay fired at lower temperatures is more effective in stopping ASR from outside sources, i.e. the blend containing the lower temperature fired clay is more alkaline resistant.

EXAMPLE 9

Referring to FIG. 10, ASTM C 109-94 was run on a "Chanute Type 1" cement and a blend of Chanute Type 1 and 20% calcined clay "Chanute Type 1P". The Chanute Type 1 cement was a low alkali cement ground in accordance with the conventional method of preparing Portland cement. The Type 1P was made in accordance with the methods of this invention. As FIG. 10 illustrates, the compressive strength of the Type 1P blend was greater than the Chanute Type 1. These results are unprecedented in the 1- to 3-day range as prior art teaches a normal reduction in early compressive strengths for concretes containing pozzolans, especially calcined clay.

EXAMPLE 10

Referring to FIG. 11A, a "Type 1" low alkali (less than about 0.6 Na₂O equivalent) cement and a blend "Type 1P" of the same Type 1 low alkali cement and 20.0% calcined clay were tested for ASR expansion due to internal alkalies by ASTM C 227-94. As FIG. 11A reflects, the Type 1P eliminated almost all ASR expansion. Therefore the Type 1P is alkali non-reactive.

Referring to FIG. 11B, the same cementitious systems were tested for ASR expansion due to external alkalies by ASTM C 1260-94 (previously ASTM P 214). As FIG. 11B reflects, again ASR expansion was almost totally eliminated in the Type 1P cement. Therefore, the Type 1P cement is alkali resistant.

FIGS. 11A and 11B prove cementitious systems of this invention are both alkali resistant and alkali nonreactive.

EXAMPLE 11

A cementitious system of this invention may be prepared that meets the ASTM specifications for 1P while serving as a substitute for Type I, Type II, and Type V Portland cements is prepared by intergrinding 6% gypsum; 17.5% calcined clay and 76.5% clinker with an alkali content of 0.75% Na₂O equivalent. The same grinding energy as used in preparation of a Type I cement (approximately 40 kwh per ton) is used.

The cementitious system will show not only low alkali functionality, but has sufficient calcined clay to be alkali non-reactive and alkali resistant. It also has sufficient early strength to allow for the addition of 10–15% Type C or F flyash while achieving comparable early strengths to that obtained if Type I had been used in place of Type 1P. The properties of alkali non-reactive and alkali resistant are maintained even with the flyash addition. This preferred composition also has the sulfate resistance comparable to Type V cement when tested by ASTM C 1012-94.

EXAMPLE 12

A cementitious system of this invention for use when low chloride permeability is required is prepared by intergrinding 6% gypsum, 25% calcined clay and 69% clinker with a 0.75% Na$_2$O equivalent. This cementitious system could be used in applications such as bridge decks and parking garages wherein the corrosion of the steel rebar is a consideration.

What is claimed and desired to be filed as Letters Patent is as follows:

1. A blended pozzolan for use with Portland cement for use in preparing a cementitious composition having a water demand of less than about 33% normal consistency as tested by ASTM C 187 or equivalent and certifiable under ASTM C 595 or ASTM C 1157 and comprising:

(a) calcined clay which has a low alkali of less than 3.0% Na$_2$O equivalent and which has been soft fired at a sufficient temperature to drive off approximately all bound water, said calcined clay being ground so as to maintain said water demand in said cementitious composition at less than about said 33% normal consistency;

(b) 2–30% by weight gypsum.

2. The blended pozzolan set forth in claim 1 which contains up to 10% of a component selected from the group consisting of KOH, K$_2$CO$_3$, K$_2$SO$_4$, K$_2$Ca (SO$_4$)$_2$.(H$_2$O)$_x$ and their sodium counterparts.

3. A blended cementitious composition for general concrete construction meeting the requirements of ASTM C 595 for cement Type IP or IPM or of ASTM C 1157 for Type GU, and comprising:

a) 4–10% by weight gypsum;

b) 40–93% by weight clinker consisting essentially of hydraulic calcium silicates;

c) 3–50% by weight calcined clay having a fineness so as to provide a water demand of less than about 33% normal consistency;

d) a sufficient amount of an alkali containing component to raise the alkali level by about 0–2.0% Na$_2$O equivalent, e) said clinker, said gypsum and said calcined clay ground as to provide said composition having a higher ultimate compressive strength as tested by ASTM C 109, increased resistance to alkali-silica-reaction when tested by ASTM C 227; increased sulphate resistance when tested by ASTM C 1012; reduced chloride permeability when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

4. A blended cementitious, alkali resistant, composition for general concrete construction meeting the requirements of ASTM C 595 for cement Type IP or IPM or of ASTM C 1157 for Type GU, and comprising:

a) 4–8% by weight gypsum;

b) 67–81% by weight clinker consisting essentially of hydraulic calcium silicates;

c) 15–25% by weight calcined clay having a fineness so as to provide a water demand of less than about 33% normal consistency;

d) a sufficient amount of an alkali containing component to raise the alkali level by about 0–2.0% Na$_2$O equivalent, e) said clinker, said gypsum and said calcined clay ground as to provide said composition having a higher ultimate compressive strength as tested by ASTM C 109, increased resistance to alkali-silica-reaction as described in ASTM C 595 Table 2 when tested by ASTM C 227 and ASTM C 1260; increased sulphate resistance when tested by ASTM C 1012; reduced chloride permeability of not greater than about 2000 coulombs at a water to cementitious composition ratio of 0.40 when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

5. A blended cementitious, low alkali functional, composition for general concrete construction meeting the requirements of ASTM C 595 for cement Type IP or IPM or of ASTM C 1157 for Type GU, and comprising:

a) 4–8% by weight gypsum;

b) 77–91% by weight clinker consisting essentially of hydraulic calcium silicates;

c) 5–15% by weight calcined clay having a fineness so as to provide a water demand of less than about 33% normal consistency;

d) a sufficient amount of an alkali containing component to raise the alkali level to about 0–2.0% Na$_2$O equivalent, e) said clinker, said gypsum and said calcined clay ground as to provide said composition having a higher ultimate compressive strength as tested by ASTM C 109, increased resistance to alkali-silica-reaction when tested by ASTM C 227 and ASTM C 1260; increased sulphate resistance when tested by ASTM C 1012; reduced chloride permeability when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

6. A blended cementitious, alkali non-reactive composition for general concrete construction meeting the requirements of ASTM C 595 for cement Type IP or IPM or of ASTM C 1157 for Type GU, and comprising:

a) 4–8% by weight gypsum;

b) 67–86% by weight clinker consisting essentially of hydraulic calcium silicates;

c) 10–25% by weight calcined clay having a fineness so as to provide a water demand of less than about 33% normal consistency;

d) a sufficient amount of an alkali containing component to raise the alkali level by about 0–2.0% Na$_2$O equivalent, e) said clinker, said gypsum and said calcined clay ground as to provide said composition having a higher ultimate compressive strength as tested by ASTM C 109, increased resistance to alkali-silica-reaction as described in ASTM C 595 Table 2 when tested by ASTM C 227 and ASTM C 1260; increased sulphate resistance when tested by ASTM C 1012; reduced chloride permeability of not greater than about 2000 coulombs at a water to cementitious composition ratio of 0.40 when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

7. A blended cementitious alkali resistant composition for general concrete construction meeting the requirements of ASTM C 595 for cement Type IP or IPM or of ASTM C 1157 for Type GU, and comprising:
   a) 4–8% by weight gypsum;
   b) 62–81% by weight clinker consisting essentially of hydraulic calcium silicates;
   c) 12–30% by weight calcined clay having a fineness so as to provide a water demand of less than about 33% normal consistency;
   d) a sufficient amount of an alkali containing component to raise the alkali level by about 0–2.0% $Na_2O$ equivalent,
   e) said clinker, said gypsum and said calcined clay ground as to provide said composition having a higher ultimate compressive strength as tested by ASTM C 109, increased resistance to alkali-silica-reaction as described in ASTM C 595 Table 2 when tested by ASTM C 227 and ASTM C 1260; increased sulphate resistance when tested by ASTM C 1012; reduced chloride permeability of not greater than about 2000 coulombs at a water to cementitious composition ratio of 0.40 when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

8. A blended pozzolan for use with hydraulic cement and comprising:
   (a) calcined clay which has a low alkali of less than 3.0% $Na_2O$ equivalent and which has been soft fired at a sufficient temperature to drive off approximately all bound water, said calcined clay being ground so as to maintain said water demand in said cementitious composition at less than about said 33% normal consistency;
   b) 2–30% by weight gypsum;
   c) a positive amount of at least one component from the group consisting of:
      i) 0–10% of a component high in available alkali
      ii) 0–25% hydrated kiln dust
      iii) 0–20% hydrated lime
      iv) 0–20% hydrated lime kiln dust
      v) 0–50% flyash
      vi) 0–5% organic plasticizer agent;
   d) said calcined clay and said components from said group being blended in such a proportion as to produce a blended pozzolan that when mixed with a hydraulic cement produces a composition which has a higher ultimate compressive strength as tested by ASTM C 109, increased resistance to alkali-silica-reaction when tested by ASTM C 227 and ASTM C 1260; increased sulphate resistance when tested by ASTM C 1012; reduced chloride permeability when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

9. A blended cementitious composition with flyash for general concrete construction meeting the requirements of ASTM C 595 for cement Type IP or IPM or of ASTM 1157 for Type GU, and comprising:
   a) 4–10% by weight gypsum;
   b) 43–81% by weight clinker consisting essentially of hydraulic calcium silicates;
   c) 10–35% by weight calcined clay having a fineness so as to provide a water demand of less than about 33% normal consistency;
   d) a sufficient amount of an alkali containing component to raise the alkali level by about 0–2.0% $Na_2O$ equivalent;
   e) 5–20% by weight flyash;
   f) whereby said composition has a high ultimate compressive strength as tested by ASTM C 109, increased resistance to alkali-silica-reaction when tested by ASTM C 227 and ASTM C 1260; increased sulphate resistance when tested by ASTM C 1012; reduced chloride permeability when tested by AASHTO T277, a water demand of less than about 33% normal consistency as tested by ASTM C 187 or equivalent, a one-day strength of at least about 1000 psi as tested by ASTM C 109 or equivalent, all as compared to Type I Portland cement as defined in ASTM C 150.

10. The composition of any one of claims 3, 4, 5, 6, 7 and 9 wherein the alkali containing component is high alkali clinker, hydrated cement kiln dust or a compound selected from the group consisting of KOH, $K_2CO_3$, $K_2SO_4$, $K_2Ca(SO_4).(H_2O)_x$ and their available sodium counterparts.

11. The blended pozzolan of claim 8 wherein the component high in available alkali includes one or more components selected from the group consisting of of KOH, $K_2CO_3$, $K_2SO_4$, $K_2Ca(SO_4)_2$ and their sodium counterparts.

12. The cementitious composition of any one of claims 3, 4, 5, 6, 7, 8 and 9 wherein:
   a. said calcined clay is a low alkali, soft fired clay which, before being soft fired, is selected from the group consisting of clays having an alkali content of less than 3.0% $Na_2O$ equivalent, and Fe content as calculated as $Fe_2O_3$ of less than about 5.0% and a quartz content not to exceed about 15%, said group of clays consisting of kaolinites, montmorillonites, illites, halloysites and mixtures thereof; and
   b. said low alkali, soft fired clay is fired at a sufficient temperature to drive off approximately all bound water.

13. A blended pozzolan for use with Portland cement for use in preparing a cementitious composition certifiable under ASTM C 595 or ASTM C 1157 and comprising:
   a) calcined clay which has a low alkali of less than 3.0% $Na_2O$ equivalent and which has been soft fired at a sufficient temperature to drive off approximately all bound water;
   b) 2–30% by weight gypsum.

* * * * *

UNITED STATES PATENT AND TRADEMARK OFFICE
CERTIFICATE OF CORRECTION

PATENT NO. : 5,626,665

DATED : May 6, 1997

INVENTOR(S) : Gregory S. Barger and Eric R. Hansen

It is certified that error appears in the above-identified patent and that said Letters Patent is hereby corrected as shown below:

In column 13, line 13, of the Patent, delete "$(H_2)_x$" before "and" and substitute -- $(H_2O)_x$ -- therefor.

Signed and Sealed this

Second Day of December, 1997

*Attest:*

BRUCE LEHMAN

*Attesting Officer*     Commissioner of Patents and Trademarks